United States Patent [19]
Vowles et al.

[11] Patent Number: 6,109,029
[45] Date of Patent: Aug. 29, 2000

[54] WAVE ENERGY CONVERTER

[76] Inventors: Alan Keith Vowles, 184 Dadson Row P.O. Box 914, Flin Flon, Mamtobu, Canada, R8A 0C7; Gerald John Vowles, 57 Joyce Crescent, Belleville, Ontario, Canada, K8N 1Y6

[21] Appl. No.: 09/013,974

[22] Filed: Jan. 27, 1998

[30] Foreign Application Priority Data

Jan. 29, 1997 [CA] Canada ................................. 2196224

[51] Int. Cl.⁷ .................................................. F16D 31/02
[52] U.S. Cl. ............................... 60/398; 60/497; 60/498; 60/502; 270/42; 270/53
[58] Field of Search ............................ 60/398, 495, 497, 60/448, 502; 290/42, 53, 54

[56] References Cited

U.S. PATENT DOCUMENTS

| | | | |
|---|---|---|---|
| 2,009,939 | 7/1935 | Massey | 60/498 |
| 2,242,598 | 5/1941 | Quinte | 60/502 X |
| 4,717,832 | 1/1988 | Harris | 60/502 X |
| 5,461,862 | 10/1995 | Ovadia | 60/502 X |
| 5,710,464 | 1/1998 | Kao et al. | 60/498 X |

*Primary Examiner*—Hoang Nguyen

[57] ABSTRACT

An apparatus and method as seen in FIG. 2 for converting the motion of waves on a body of fluid 52 into useable energy. This apparatus employs a wave follower 20 to track the rising and falling waves. The reciprocating wave follower interacts with a driven device, such as a pump 202*a* or generator 202*b* through an optional lever arm 171 and also through a drive member such as a reciprocating shaft 26. Because the driven device is incorporated into an essentially immovable floating or fixed support member 17, work is accomplished. By increasing the work producing travel distance of the driving member, being the wave follower 20 beyond that of previous art and, in certain embodiments such as that shown in FIG. 2, and by more effectively capturing surge forces that has previous art, this apparatus is intended to produce significantly more work than other similar devices operating in the same waves.

15 Claims, 16 Drawing Sheets

WAVE ENERGY CONVERTER

This patent application relates to

U.S. Pat. No. 5,405,250 titled Wave Energy Extraction Device (Vowles), and

European Patent No. 0526604 titled Wave Energy Generator (Vowles), and

Canadian Patent application No. 2,081,381-4 (Vowles) wherein all rights previously held by Bruce Vowles of Kitchener, Ontario, Canada have now been assigned to co-inventors Alan K. Vowles of Flin Flon, Manitoba, Canada and Gerald J. Vowles of Belleville, Ontario, Canada.

BACKGROUND OF THE INVENTION

This invention relates generally to devices which are designed to extract energy from the action of waves on a body of fluid. This is achieved by converting the energy in the undulating waves into a useable form for the purpose of powering a variety of devices or processes. More particularly, this invention relates to a double acting device capable of extracting energy from a greater percentage of both the rising and the falling waves than do other similar devices. Numerous other wave energy converter designs have been tested but have failed to reach commercialization. This is primarily because they could not compete economically with existing energy sources such as hydro, nuclear power, and fossil fuels, or because their initial cost was too high. This invention is intended to overcome these and other problems.

With the ever increasing need to be environmentally responsible, more attention is being paid to clean, renewable energy sources. This invention is intended to provide an environmentally benign means by which significant amounts of renewable and sustainable energy can be produced. Furthermore, it is well documented that the need for such basic human needs as fresh water, food, and energy for warmth and development is growing rapidly—as are shortages of these commodities. This invention is intended to offer a means by which these issues and challenges can be addressed more effectively than in the past.

Current research is trending toward the development of smaller devices which may be used as a plurality. Such smaller devices are typically more resistant to storm damage and also offer much lower development and deployment costs. Until now, however, they have been less efficient than their larger counterparts. This invention is intended to provide a means of greatly improving the efficiencies of these smaller devices, thus making them practical. This improved efficiency is not, however, limited to the smaller devices, as it works equally well on larger devices.

SUMMARY OF THE INVENTION

The present invention seeks to provide a more efficient apparatus for the extraction of energy from waves on a body of fluid on both the rise and fall of said waves. Improved efficiency will be achieved by increasing the effective travel of the device's driving component -hereafter called a wave follower- for any given wave height. This is done in a manner which allows any linked driven component or device to accomplish more work than would a similar apparatus without this novel feature.

According to a preferred embodiment of the present invention there is provided an apparatus for converting the motion of waves on a body of fluid to useable energy, said apparatus comprising rotatable support means being designed to
  float in a body of fluid, or
  be solidly attached to earth, or
  be solidly attached to another floating device, or
  be solidly attached to another device which is solidly attached to earth; and wherein said rotatable support means may further incorporate a fixedly attached component reaching downward to a point below that which any normal, significant wave action occurs, and wherein said fixedly attached component may be a tube, pipe or cylinder into which other components such as, but not limited to, a piston rod, piston, accumulator, filters or membranes may be assembled;

one or more lever arm means which determine mechanical advantage, said lever arm means being pivotally attached at a fulcrum to said rotatable support means;

wave follower means for tracking both the rise and fall of said body of fluid, said wave follower means being attached to said lever arm means;

drive transfer means being attached to said lever arm means between said wave follower means and said fulcrum, or
  on an opposite side of said fulcrum from said wave follower means, or
  such that said wave follower means lies between said fulcrum and said drive transfer means, and is actuated by the reciprocating motion of same lever arm means;

counterweight means being attached at an opposite end of said lever arm means from said wave follower means, to better balance the weights on either side of said pivotally attached lever arm means;

side wall means to enclose the arriving waves in order to focus forces other than buoyant force on the wave follower;

optional underwater angled ramp means, being either straight or curved, to increase the height of the arriving waves, thus resulting in increased wave follower travel distance;

optional funnelling panels means to increase the height of the arriving waves, thus resulting in increased wave follower travel distance;

as well as the following novel features comprising:
  modification to said wave follower means incorporating;
    an outer surface having a plurality of depressions, which may be concave such as those found on a golf ball, for the purpose of increasing the lifting action of the waves on the wave follower, and
    a bottom surface which is formed to incorporate one or a plurality of depressions, which may be concave, in order to maximize the ability of said wave follower to benefit from surface adhesion and/or suction when the wave is falling away;
  load release and re-establish means for increasing the effective travel distance of (any combination of) said wave follower means, lever arm means and drive transfer means at a given wave height on both the rise and fall of said waves, said load release and re-establish means being connected such that it will release and allow said drive transfer means or said wave follower means or said lever arm means or a combination of them to suddenly change their position in relation to the body of fluid in which the wave follower is floating, without having to overcome the resistance of, or to actuate, any attached driven device, and said load release and re-establish means will re-establish said load once said drive transfer means or said wave follower means or said lever arm means or a combination of them has changed its position as needed, and said release of load resistance and re-establishing of load resistance from said driven device will occur at or near both the highest point of the crest and the lowest point of the trough of said wave, or will be used as a plurality to accomplish said releasing and re-establishing of said load resistance;

alternate optional load release and re-establish means which can also be used with wave followers designed to work in one direction only, thus eliminating the need for wave followers/floats to employ springs, weighting, elastic members or other means for the purpose of pulling them back down into a wave trough in order to set up for the next oncoming wave crest. This allows such a uni-directional wave follower to increase its efficiency by eliminating a non-productive load and to be dynamically balanced;

optional mechanical advantage modifier means, such as (but not limited to) a cam, which allows the apparatus to progressively vary the mechanical advantage to said drive transfer means as it moves through both strokes in its reciprocating cycle and in a way which reduces the force required, with each change of stroke direction, for said driven device to unlock and thereby function, albeit at reduced output, in smaller waves—energy which would not otherwise be harvested;

optional irregularly spaced, horizontally oriented heave reaction plates means for holding said support structure substantially stationary relative to the rise and fall of said wave follower and said waves; wherein said reaction plates are selectively and progressively flexible such as are the blades of some windmill propellers defined as self-furling. This self-furling feature allows the apparatus to roll with the punches of extreme or unusual wave impacts and then to return to normal operation, rather than to be torn apart, bent or rendered inoperable due to that extreme wave impact;

rear wall means being part of said support structure or of said wave follower and acting as a wave terminating member for the purpose of focusing forces other than buoyancy and gravity on said wave follower; and optional linked global positioning/locating system and propulsion system for the purpose of either maintaining the position of said apparatus, if un-anchored, or directing said apparatus to move to a given point or come ashore even when un-manned, or locating said apparatus if forced or otherwise moved away from its expected geographic position whereby said propulsion system may or may not be driven by direct or indirect power provided by the action of said waves;

optional vertically oriented surge reaction plates being remote, flexibly attached to said rotatable support means more or less directly behind and in front of said wave energy converter, said surge reaction plates being perpendicular to the surface of the fluid but below the wave effected zone and with their face being parallel to the incoming waves, said surge reaction plates for the purpose of reducing backward and forward lateral movement of the apparatus just as lateral forces in said waves are being redirected to focus on said wave follower.

optional outrigger reactor means, such as but not limited to floats, for the purpose of keeping the front of the apparatus aligned with the incoming waves, said outrigger reactor means being fixedly attached to said rotatable support means by arms and extending to the side(s) of said rotatable support means such that an incoming wave, on encountering one or the other first and not being able to readily lift it will force it back instead until such time as both are under more or less equal pressure from that wave. This design is intended to overcome the effects of local winds or currents running at an angle to the waves, these causing said wave follower to be aligned at an undesirable angle to said waves.

According to a second preferred embodiment of the present invention there is provided an apparatus for converting the motion of waves on a body of fluid to useable energy, said apparatus comprising rotatable support means being designed to float in a body of fluid, or be solidly attached to earth, or be solidly attached to another floating device, or be solidly attached to another device which is solidly attached to earth; and wherein said rotatable support means may further incorporate a fixedly attached component reaching downward to a point below that which any normal, significant wave action occurs, and wherein said fixedly attached component may be a tube, pipe or cylinder into which other components such as, but not limited to, a piston rod, piston, accumulator, filters or membranes may be assembled;

one or more optional lever arm means which determine mechanical advantage, said optional lever arm means being pivotally attached at a fulcrum to said rotatable support means;

drive transfer means being attached to said optional lever arm means between said wave follower means and said fulcrum, or on an opposite side of said fulcrum from said wave follower means, or such that said wave follower means lies between said fulcrum and said drive transfer means, or alternately being attached directly to said wave follower means when optional lever arm is not present, said drive transfer means being actuated by the reciprocating motion of said optional lever arm means, when present; as well as the following novel features comprising wave follower means for tracking the rise and fall of said body of fluid, said wave follower means being attached either to said optional lever arm means or alternately being attached directly to said drive transfer means and incorporating an outer surface having a plurality of depressions, which may be concave such as those found on a golf ball, for the purpose of increasing the lifting action of the waves on the wave follower, and a bottom surface which is formed to incorporate one or a plurality of depressions, which may be concave, in order to maximize the ability of said wave follower to benefit from surface adhesion and/or suction when the wave is falling away;

load release and re-establish means for increasing the effective travel distance of (any combination of)

said wave follower means, lever arm means and drive transfer means at a given wave height on both the rise and fall of said waves, said load release and re-establish means being connected such that it will release and allow said drive transfer means or said wave follower means or said lever arm means or a combination of them to suddenly change their position in relation to the body of fluid in which the wave follower is floating, without having to overcome the resistance of, or to actuate, any attached driven device, and said load release and re-establish means will then re-establish said load once said drive transfer means or said wave follower means or said lever arm means or a combination of them has changed its position as needed, and said release of load resistance as well as re-establishing of load resistance from said driven device will occur at or near both the highest point of the crest and the lowest point of the trough of said wave, or will be used as a plurality to accomplish said releasing and re-establishing of said load resistance;

alternate optional load release and re-establish means which can also be used with wave followers designed to work in one direction only, thus eliminating the need for wave followers/floats to employ springs, weighting, elastic members or other means for the purpose of pulling them back down into a wave trough in order to set up for the next oncoming wave crest. This allows such a uni-directional wave follower to increase its efficiency by eliminating a non-productive load;

optional mechanical advantage modifier means, such as (but not limited to) a cam, which allows the apparatus to progressively vary the mechanical advantage to said drive transfer means as it moves through both strokes in its reciprocating cycle and in a way which reduces the force required, with each change of stroke direction, for said driven device to unlock and thereby function, albeit at reduced output, in smaller waves energy which would not otherwise be harvested;

optional irregularly spaced, horizontally oriented heave reaction plates means for holding said support structure substantially stationary relative to the rise and fall of said wave follower and said waves; wherein said reaction plates are selectively and progressively flexible such as are the blades of some windmill propellers defined as self-furling. This self-furling feature allows the apparatus to roll with the punches of extreme or unusual wave impacts and then to return to normal operation, rather than to be torn apart, bent or rendered inoperable due to that extreme wave impact;

optional linked global positioning/locating system and propulsion system for the purpose of either maintaining the position of said apparatus, if un-anchored, or directing said apparatus to move to a given point or come ashore even when un-manned, or locating said apparatus if forced or otherwise moved away from its expected geographic position whereby said propulsion system may or may not be driven by direct or indirect power provided by the action of said waves;

optional dome attached to the top of said wave follower for the purpose of preventing pinnipeds, such as seals, or other creatures from resting or establishing habitation on said wave follower providing security for service personnel working atop the wave follower providing protection for various components of the apparatus;

optional load eliminating buoyant component means fixedly attached to said rotatable support means being located such that an upper end breaks the surface of the fluid on which the apparatus is floating and another end extends downward below the surface, said load eliminating buoyant component means exerting a buoyant force sufficient to hold the apparatus at the surface of the fluid on which it is floating without relying on the buoyancy of the wave follower means and thereby not reducing the effectiveness of the wave follower; and wherein said optional load eliminating buoyant component may protrude up through the wave follower so as not to interfere with or block the advancing waves from making direct or diminished contact with the wave follower from any direction, or wherein said optional load eliminating buoyant component may partially or fully circumscribe said wave follower means for the purpose of offering protection to the wave follower means in cases where local wave and storm action may be a threat to the ongoing functionality of the wave follower means.

other embodiments may contain a combination of some or all of the above components and features; characterized in that the wave follower means comprises a buoyant upper body portion for tracking the rise of the waves, and a lower body portion incorporating at least one ballast filled or fillable chamber for tracking the fall of the waves. The lower chamber is either enclosed on the top and sides with a mouth opening on the bottom or alternately, it is fully enclosed. In the case of the open bottomed chamber, the ballast is comprised of the portion of that fluid in which the wave follower is floating and which is enclosed by the top and side walls of the chamber. Fluid can freely enter and fill the chamber on the rise of the waves because the air which otherwise occupies the chamber is allowed to escape through a one way valve vented to the external atmosphere. In the case of the fully enclosed chamber the ballast is comprised of some other suitable material or body of fluid and which is held separate from the body of fluid in which the wave follower is floating, and also incorporating an optional angled seaward face to harness the energy of the lateral force of the waves by redirecting that force so as to compliment other forces being harvested by the wave follower;

further characterized in that the load release and re-establish means is comprised, but not limited to, an assembly of known components which may include one or a plurality of; pressure release valves, pressure sensing switches, height sensing switches, clutches, brakes, solenoids or release pins or cams, and which may or may not be further controlled by a programmable logic controller or similar control device in order to optimize the response of the load release and re-establish means to varying wave heights and patterns. Slightly preceding or immediately after a wave reaches its highest point of travel and begins to fall away, the load release and re-establish means momentarily reduces or eliminates the resistive load applied to the wave follower by any driven device, thus allowing the buoyant upper body portion of the wave follower to quickly travel the extra distance needed to refloat itself. Further, slightly preceding or immediately after a wave reaches its lowest point of travel, being in the trough, and begins to rise again, the load release and re-establish means momentarily reduces or eliminates the resistive load applied to the wave follower by the driven device, thus allowing said fluid (ballast) filled lower chamber to quickly fall, travelling the extra distance needed to become re-submerged. The load release and re-establish means is not designed to latch or lock or otherwise prevent the wave follower from moving with the surface of the waves at any time but rather to release the load on the wave follower so that it may move quickly upwards to find it's natural level at the peak of a rising wave in order to reposition itself for a lengthened working stroke on the falling wave and also so that it may move quickly downwards to find it's natural level at the bottom of a falling wave in order to reposition itself for a lengthened working stroke on the subsequent rising wave. Also, the load release and re-establish means will allow the wave follower to respond more efficiently to local storm waves which are superimposed upon the larger wave swells, thereby increasing the effective output of the apparatus. The load release and re-establish means will also allow the wave follower to react to smaller waves than is possible with a similar unit without the feature, thereby increasing the effective output of the apparatus once again;

still further characterized in that the variable mechanical advantage of the apparatus controlled by the optional mechanical advantage modifier means, is at its highest as the wave begins a change of direction immediately after reaching its lowest point and again after reaching its highest point. This mechanical advantage then progressively decreases as the wave follower becomes a) progressively more submerged on the rising wave, and b) progressively held more out of the fluid on the falling wave. This condition of decreasing mechanical advantage continues until such time as the wave changes directions thus activating the load release and re-establish means. Thus the mechanical advantage modifier means allows for earlier unlocking and therefore, travel of the wave follower, rendering it operable in times of smaller than normal wave heights when other devices designed for normal wave patterns would cease to function due to their inability to unlock at smaller wave heights. The mechanical advantage modifier means may be employed as a plurality in order to act sequentially, or cumulatively to power driven devices. In a preferred embodiment, the mechanical advantage modifier means would usually perform its function between the driving and driven components;

still further characterized in that the irregularly spaced, horizontally oriented heave reaction plates means being located below the undulating action of the waves are attached in a plurality of more than two such that the varying distances between the plates will minimize undue vertical movement of the apparatus due to any harmonic movement of the water below normal wave action depth. These unequally spaced reaction plates are solidly attached to the rotatable support means by a connecting component of essentially unchangeable length but with optional lateral flexibility such as, but not limited to, a rod, pole, tube or framework. Further, a plurality of smaller diameter plates will provide greater structural integrity than one single large plate;

still further characterized in that suitable working distance between the wave follower means and rear wall means is maintained in that the centre of the arc of a circle scribed by the rear wall means and the centre of the arc of a circle scribed by the closely adjacent face of the wave follower means and the centre of the fulcrum of the wave follower are common. This design increases the wave follower's capacity to do work by focusing forces other than only floatation and gravity on the wave follower. Further, the rear wall may be formed to enclose the wave follower in such a way as to minimize the flow of fluid past the wave follower as it rises and falls with the waves, this in order to maximize the capture and conversion of said other forces.

Regarding the numbering associated with the above Figures, the numbers 1 to 19 have been reserved for these drawings, the numbers 20 to 199 and 300 up have been reserved for part, feature and attribute references within the figures and the numbers 200 to 220 have been reserved for varying views of the Wave Energy Converter apparatus.

Further embodiments of a Wave Energy Converter being solidly attached to ground or another immovable body are not shown as they do not differ significantly in operation from those pictured in the included figures other than they do not require the use of reaction plates or damper plates and their means of attachment to any fixed body are much varied and of well known technology.

DESCRIPTION OF THE PREFERRED EMBODIMENTS

Figure 1:
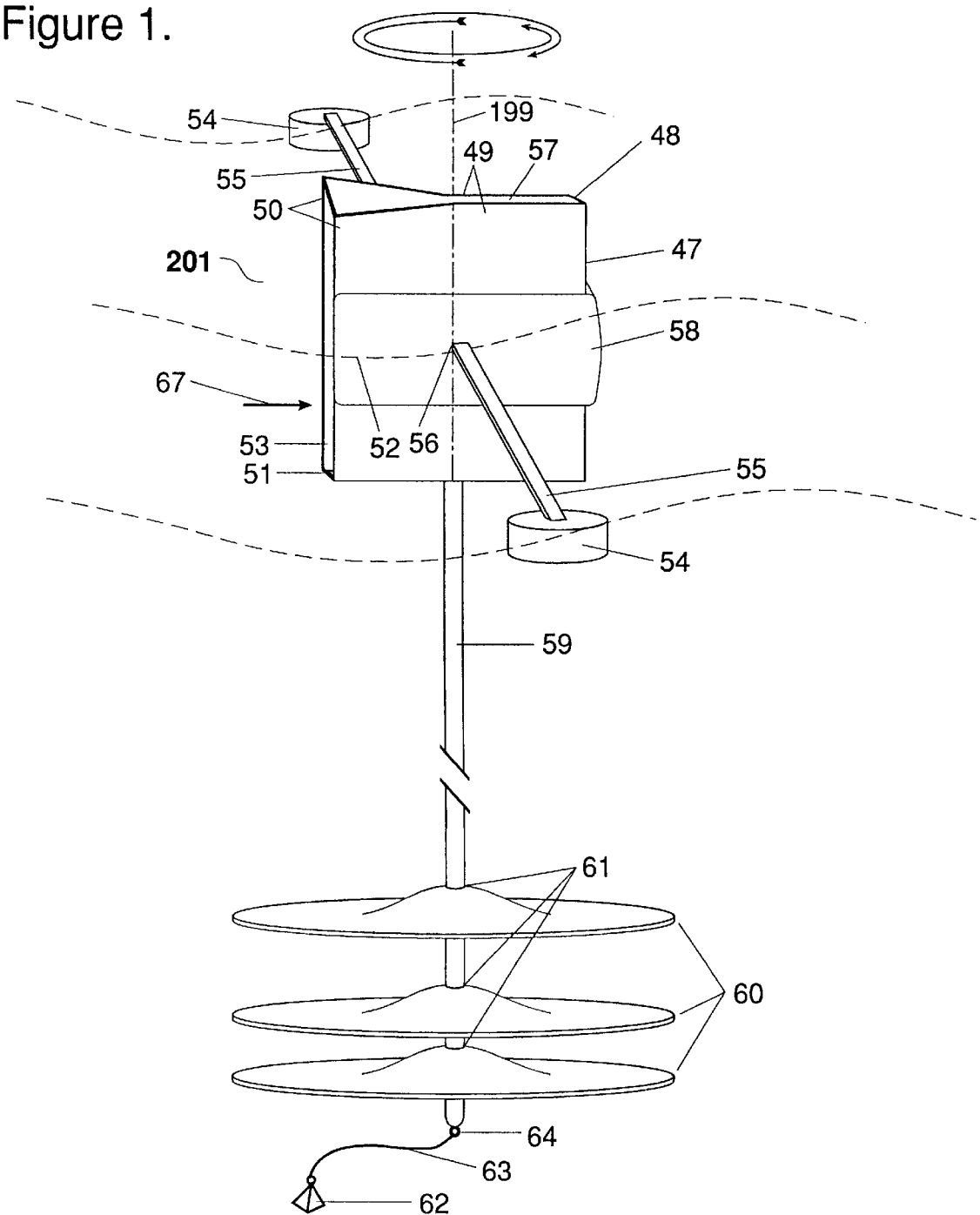
FIG. 1 is a modified perspective view of a floating Wave Energy Converter incorporating a wave termination feature, self-alignment feature and off-set heave reaction plates feature in accordance with a first preferred embodiment of the invention.

Referring to FIG. 1, the floating wave energy converter as seen at 201 is comprised of an enclosure 47 which is designed to trap the energy of incoming waves. The enclosure 47 is made up of a top panel 57, a back panel 48 and two side panels 49. Vertically mounted funnelling panels 50 are fixedly attached to the side panels 49 at an angle such that the waves 67 which enter the apparatus through an open front 53 are amplified in height as the channel established by the funnelling panels 50 becomes narrower. The bottom of the enclosure is open other than for a full or partial ramp 51 (which is described in a subsequent Figure). The apparatus 201 floats in a body of fluid such as an ocean, with an upper portion being above the height of the significant waves on the surface 52 of the fluid. A floatation collar 58, being fixedly attached to the side panels 49, the rear panel 48 and optionally to the funnelling panels 50 but not across the open front 53, provides this floatation. Because the apparatus operates most efficiently when the open front 53 is aligned with the direction of the oncoming waves 67, the apparatus must be capable of realigning itself as wave direction changes. In trying to deal with this problem, others have relied on the local wind direction to align their devices. In practice, this has proven to be less than ideal as very often, local wind direction differs from the direction of the larger, more energy rich swells which have been generated far off by winds blowing in a direction different than the local winds. This problem has been significantly reduced by attaching outrigger float assemblies made up of a buoyant element 54 being fixedly attached to a stiff arm 55 which is solidly affixed at 56 to the side panels 49 of the enclosure 47. These outrigger float assemblies protrude laterally out from the sides of the enclosure 47 on a more or less horizontal plane such that they float in the body of fluid in which the apparatus 201 floats but do not provide additional floatation for the apparatus 201, that being the exclusive function of the floatation collar 58. As the apparatus 201 may, from time to time, begin to rotate it's open front 53 somewhat away from the oncoming waves, one or the other of the outrigger float assemblies will swing frontward toward the oncoming waves 67 while the one on the other side will swing backward away from the oncoming waves 67. The next oncoming rising wave will thus strike the more frontward rotated float first and being a rising or cresting wave will therefore attempt to lift the float 54, it being a buoyant body. However, the reaction plates 60 (which are described in a subsequent Figure) and the stiff arm 55 prevent the apparatus generally and the outrigger float 54 specifically from lifting. Because the floating apparatus 201 is freely rotatable on it's vertical (Y) axis 199, the buoyant energy acting on the frontward outrigger float 54 is then redirected to push the float 54 backward until such time as both outrigger floats 54 are under more or less equal pressure from the oncoming wave front 67. At this point the open front 53 of the apparatus 201 will again be aligned properly with the oncoming waves 67. The length of the arms 55 are determined by the prevailing or significant wave length at the point of installation of the apparatus 201 such that the rearward rotated float 54 will, most often be located in a wave trough when a frontward rotated float 54 is being influenced by a wave crest. Fixedly attached to and extending downward from the enclosure 47 a support member 59 such as a somewhat flexible rod, pole or tube, is also fixedly attached at points 61 to reaction plates 60 which are located at a depth below that effected by motion of the prevailing or significant waves at that site. Reaction plates have been used in other similar applications but have not previously provided a means for lowering their own effectiveness (and related damage) when it would be more beneficial to give way. The unique self-furling reaction plates 60 here described are very stiff toward their centre and become progressively more flexible toward their outer edges—such that they will "give" progressively to the degree required to eliminate or minimize the potential for the apparatus 201 being damaged in the event of sudden, extreme and unusual upward, downward or lateral forces being applied to the apparatus 201, generally due to major storms or tsunami waves. The apparatus 201 is usually held in position by an anchor 62 or other mooring device and an attached cable 63 which is at another end, attached to the support member 59 by an appropriate fastening means 64 but is not limited to use when so anchored.

Figure 2:
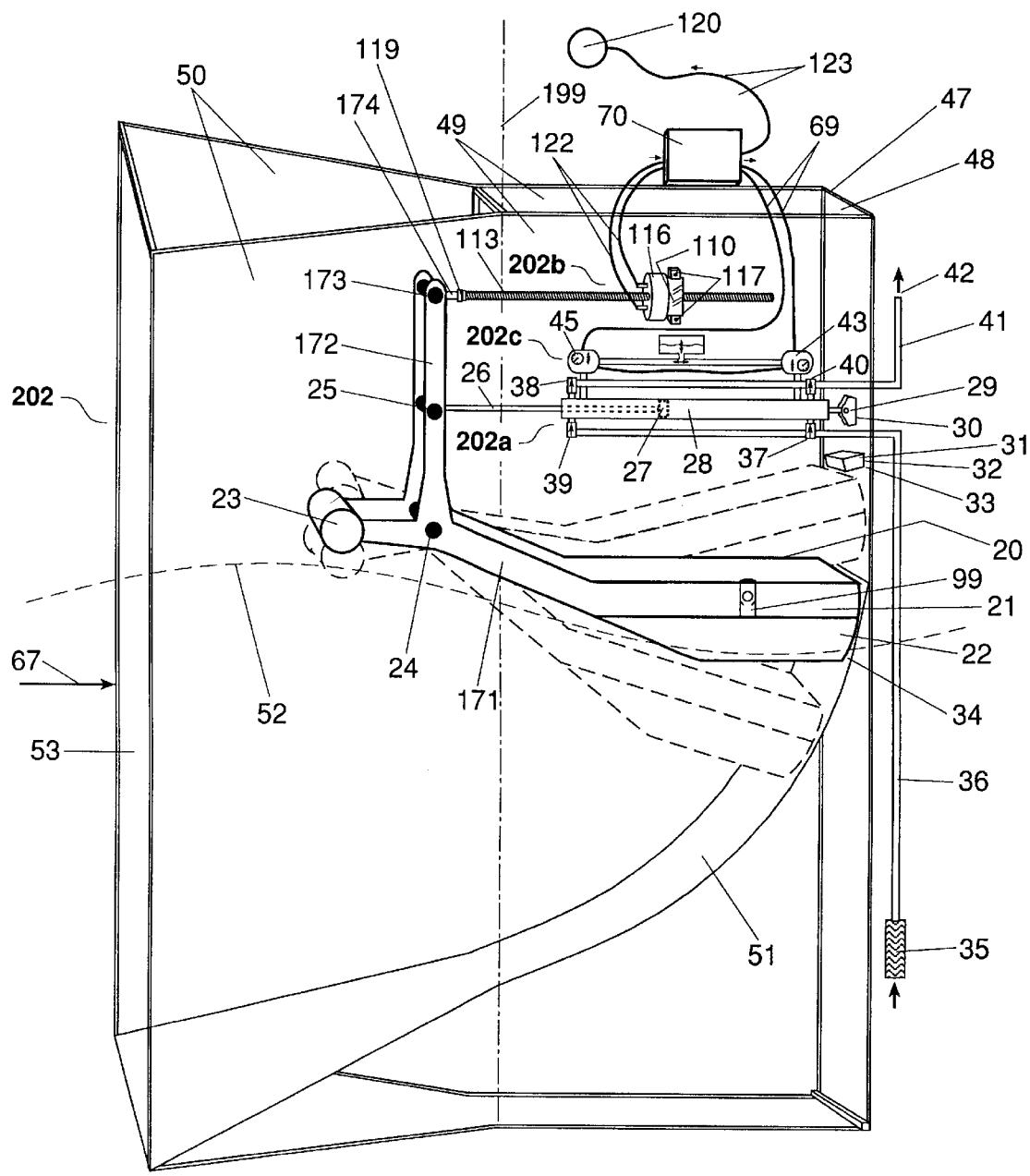
FIG. 2 is a detailed modified perspective view of the upper portion of the apparatus shown in FIG. 1. wherein a two-way reciprocating pump and an electricity generator are both driven devices and wherein solenoids/release valves/sensors/switches as well as external devices are powered or charged by energy produced by the apparatus itself in accordance with a first preferred embodiment of the invention.

FIG. 2, provides a more detailed view at 202 of the interior components of the wave energy converter specified in FIG. 1. It is comprised of a full or partial wave ramp 51 which is angled upward until it becomes curved to match the arc scribed by the wave follower 20 rotating on an arc about it's fulcrum 24. At a point lying more or less in line with where the wave follower 20 would float when at rest, the upper end of the curved portion of the wave ramp 51 is fixedly attached to the rear panel 48 of the enclosure 47. The purpose of the wave ramp 51 is twofold. First, it, along with the side panels 49 and the rear panel 48 enclose and focus much of the potential wave energy onto the wave follower 20 making this a wave termination apparatus. Secondly, the wave ramp 51 causes a shoaling effect which is known to increase the height of the waves such as does the narrowing channel established by the angled funnelling panels 50 after the waves 67 enter the enclosure 47 through it's open front 53. The effect of increased wave height is to increase the upward and downward travel distance of the wave follower 20, this being convertible to more foot/pounds or newton/ metres of work. Wave follower travel in relation to wave motion becomes apparent in the following text. The wave follower 20 incorporates an upper body portion or flotation unit 21 which is made of any suitable buoyant material, a lower body portion 22 constructed in the form of a hollow chamber and having a complete or partial opening at it's bottom. The lower body portion 22 is attached to the underside of the buoyant upper body portion 21, so that when the wave follower 20 is placed in fluid the upper body portion 21 floats on the surface of the fluid 52, while the lower body 22 remains relatively submerged. A one-way check valve 99 is located in a passage in the buoyant upper body portion 21 for the purpose of allowing air to escape from the lower chamber 22. The operation of the wave follower 20 can be explained as follows. With the absence of waves on the surface of the fluid 52 and with the chamber 22 filled with fluid, the buoyant upper portion 21 of the wave follower floats on the fluid and the lower portion 22 is submerged. However, on the rise of a wave, (an upward stroke with regard to the wave follower), the buoyant upper body portion 21, (after overcoming the resistance of the loads 202*a* and 202*b*,) tracks the rise of the wave. Since the fluid in the open bottomed lower chamber 22 is of the same density as the wave and is actually a part of that wave, work is only required to raise the buoyant upper body 21 of the wave follower 20. The fall of the wave starts the downward stroke of the wave follower 20 (again, after overcoming the resistance of the loads 202*a* and 202*b*,). As the falling wave trough is tracked by the wave follower, fluid in the chamber 22 will attempt to flow out of the opening at the bottom of the chamber 22. The one-way check valve 99 which is closed at times of pressure equilibrium or pressure drop, prevents the free outflow of fluid from the chamber 22. As the wave falls and the fluid outside the chamber 22 begins to fall away, that fluid in the chamber 22 being now held above the level of that fluid outside the chamber, is pulled down. Also, the suction effect created, and surface adhesion both pull the wave follower 20 down as the wave falls. The force of suction is created as the fluid tries to fall from the lower body portion 22 but cannot because of the now closed one-way check valve 99. The condition of surface adhesion is created as the fluid attempts to break its bond with the roof of the chamber of the lower body portion 22. If the lower body chamber 22 is not entirely filled with fluid because fluid has escaped during the fall of a previous wave (downward stroke with regard to the wave follower) or due to turbulence in the body of fluid, the rise of the next wave 67 causes fluid to attempt to re-enter the chamber 22 through the opening at it's bottom, thereby causing an increase in pressure of the air contained between the fluid and the roof of the chamber 22. The increase in air pressure causes the one-way valve 99 to open, thus allowing air to be exhausted from the lower chamber 22 and, thereby, allowing fluid to freely once again enter and fill the lower chamber 22 through it's open bottom. In accordance with this invention, it is further possible to virtually double the output of the apparatus 202 as described to this point. This capability will become apparent as more detailed drawings of the pump assembly 202*a* are described in FIG. 3 at 203*a* and 203*b*.

Expanding further on FIG. 2, the load release and re-establish means presented at 202*c* is a hydraulic valving system which is just one of several possible load release and re-establish means configurations. A load release and re-establish means may be any hydraulic, pneumatic, mechanical, electromechanical or other means whose function is to momentarily release the wave follower 20 from the driven and systemic loads of the apparatus 202 such that the wave follower 20 is allowed to find it's own level without the influence of these load resistances. Upon finding it's level, the load is then re-established on the wave follower. This releasing and re-establishing of the load takes place both as a wave 67 reaches the highest point of it's crest and begins to fall and also when a wave 67 reaches the lowest point of its trough and begins to rise. As the wave 67 reaches it's highest point and no more work can be accomplished by the wave follower's 20 moving upward, the load release and re-establish means 202*c* senses the beginning of a change of direction in the wave (according to adjustable preset parameters) and releases the load on the wave follower 20. Because the force of the load on the wave follower 20 has caused the wave follower 20 to become virtually submerged as it tracked the rising wave, releasing that load allows the wave follower 20 to continue rising in that it "pops" up by a distance equal to the thickness of the buoyant upper portion 21 of the wave follower 20. While no work is accomplished during this "popping up," the wave follower 20 is, nonetheless, now positioned to benefit from extended work producing travel as it tracks the falling wave 67. Once the wave follower 20 has "popped" and the buoyant upper body 21 is floating on the surface of the wave 52, the pressure sensor (185/FIG. 3-203*b*) detects a preset low pressure condition and the load on the wave follower 20 is re-established by re-closing the valve gates 193 of the sensor/solenoid valves 45 and 43. Likewise, as the wave 67 reaches it's lowest point and no more work can be accomplished by the wave follower's 20 moving downward, the load release and re-establish means senses the beginning of a change of direction in the wave (according to adjustable preset parameters) and again releases the load on the wave follower 20. Because the force of the load on the wave follower 20 has caused it to be held above the body of fluid to a height nearly that of the thickness of chamber 22 as it tracked the falling wave, releasing that load allows the wave follower 20 to continue descending in that it "drops" down (due to gravity pulling on that water in the lower chamber 22 held above the level of the wave) by the thickness of the chamber 22 of the wave follower 20. While no work is accomplished during this "dropping," the wave follower is, nonetheless, now positioned to benefit from extended work producing travel as it tracks the next rising wave 67, to begin the cycle again. Once the wave follower 20 has "dropped" and the chamber 22 is re-submerged below the surface of the wave 52, the pressure sensor 185 detects a preset low pressure condition and the load on the wave follower 20 is re-established by re-closing the valve gates 193 of the sensor/solenoid valves 45 and 43. The load discussed above is made up of that resistance set up by the pump assembly 202a, the linear drive/generator assembly 202b and normal systemic resistances such as friction. In this way the output from a wave energy converter incorporating such a load release and re-establish means can be increased by up to double that of a similar device not so equipped.

Figure 3:
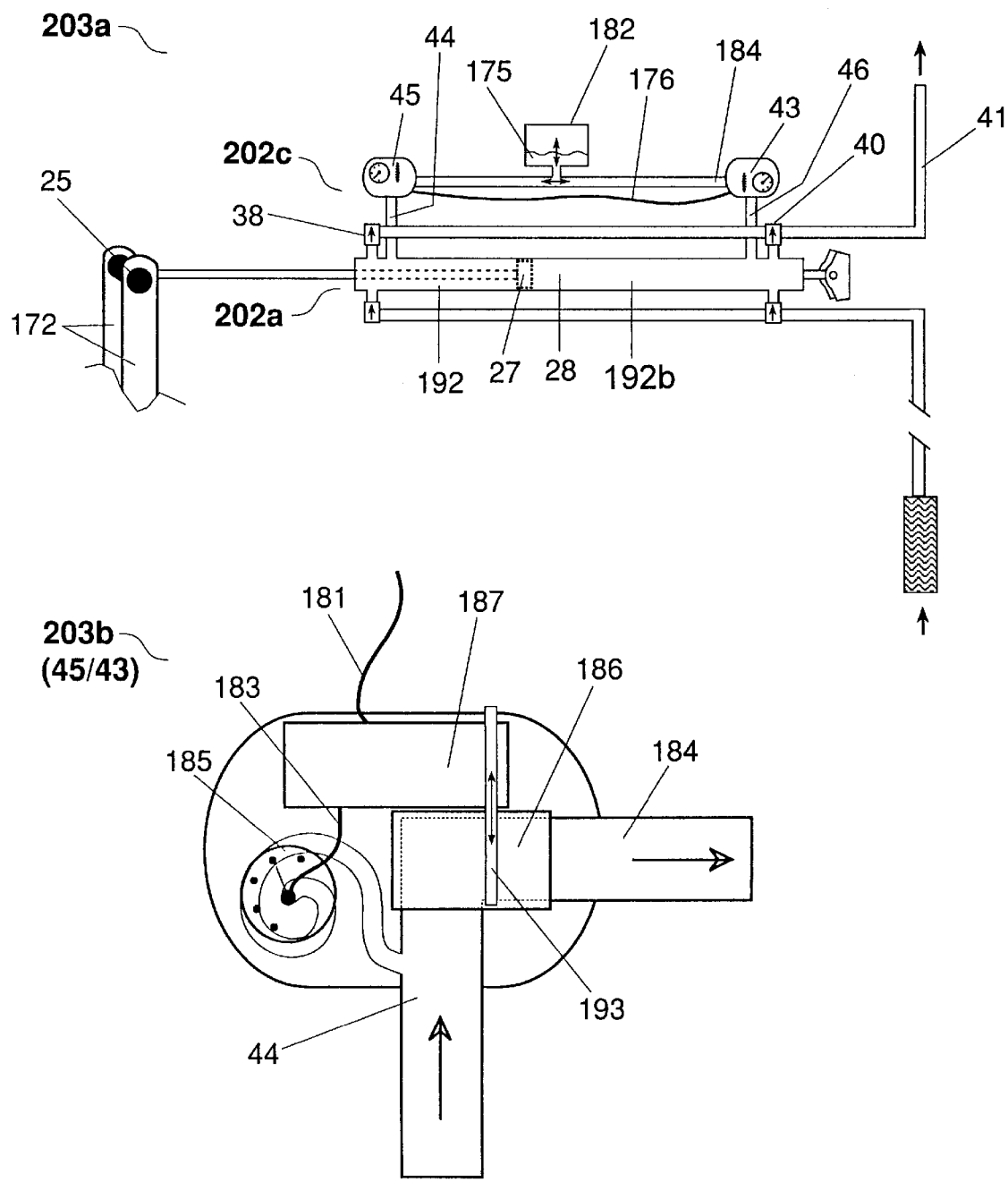
FIG. 3 is a more detailed modified perspective view of the two-way reciprocating pump as shown in FIG. 2 and more specifically of the load release and re-establish means used.

In FIG. 3 a still more detailed view of the pump assembly 202a and more particularly the load release and re-establish means 202c are seen. Also, a more detailed view of one of the integrated sensor/switch/valves 45 is seen at 203b. At 202a in FIG. 3, we see the pump assembly previously described being connected to the lever arm extension 172 by a pivotal joint 25. As fluid is pushed ahead of the rising piston 27 in the upper part 192 of cylinder 28, thereby reducing the volumetric capacity in that upper part 192 of the cylinder 28, that same fluid is pressurized to a predictable and measurable pressure range which is hydraulically transmitted through pressure tube 44 to an integrated sensor/solenoid valve 45. As long as the wave follower continues to rise while tracking the rising wave, the sensor/solenoid valve 45 remains closed, hence allowing the piston to force fluid out of the upper cylinder 192, through the check valve 38 and on through the outlet tube 41. As the crest of the wave reaches it's maximum height and then begins to fall, the buoyant force which had been exerted on the wave follower by the rising wave begins to decrease. There is immediately a corresponding drop in fluid pressure applied in the upper cylinder 192. As soon as the pressure sensor 185 in the sensor/solenoid valve 45 (as shown at 203b) determines that this pressure drop exceeds a preset amount it activates the solenoid valve mechanism 187 by means of a linkage 183. (The solenoid switch in this particular embodiment of the invention is electrical, receiving it's power via a power cable 181). This in turn opens a gate 193 in valve body 186. The pressurized fluid, until now being applied against the driven load by the piston 27, is now provided with a path of minimal resistance through the opened valve 186, and on down a bypass tube 184. At the same time that the sensor 185 caused the valve gate 193 in the sensor/solenoid valve 45 to open, it simultaneously caused the valve gate 193 in the sensor/solenoid valve 43 to open as well by transmitting a signal to it via a signal cable 176. These simultaneous valve openings allow for clear passage of the fluid in the upper cylinder 192 into the lower cylinder 192b. In order to adjust for differences of volumetric pressure between the upper cylinder 192 and the lower cylinder 192b as well as for expansion, contraction and other factors, an accumulator or reservoir 182 is installed into the bypass tube 184 such that the fluid 175 will extend into or exit from the accumulator 182. Thus the fluid to be evacuated from the upper cylinder 192 can enter the lower cylinder 192b freely and quickly. In this way the wave follower is suddenly released of it's load resistance. As a result, the buoyant upper body portion of the wave follower which, until now has been virtually submerged as a result of the load resistance (having being designed to be just enough less than the buoyant force acting upon the wave follower to unlock the device and allow the wave follower to track the rising wave,) pops up to float virtually fully on the surface of the fluid because the wave follower has been dynamically balanced by the counterweight as was previously explained. Once the wave follower 20 has "popped" and the buoyant upper body 21 is floating on the surface of the wave 52, the pressure sensor 185 detects a preset low pressure condition and the load on the wave follower 20 is re-established by re-closing the valve gates 193 of the sensor/solenoid valves 45 and 43.

At this point the process is reversed. As fluid is pushed ahead of the falling piston 27 in the lower part 192b of cylinder 28, thereby reducing the volumetric capacity in that lower part 192b of the cylinder 28, that same fluid is pressurized to a predictable and measurable pressure range which is hydraulically transmitted through pressure tube 46 to sensor/solenoid valve 43. As long as the wave follower continues to fall while tracking the descending wave, the sensor/solenoid valve 43 remains closed, hence allowing the piston to force fluid out of the lower cylinder 192b, through the check valve 40 and on through the outlet tube 41. As the trough of the wave reaches it's lowest point and then begins to rise, the gravitational force which had been exerted on the wave follower by the falling wave suddenly begins to decrease. There is immediately a corresponding drop in fluid pressure applied in the lower cylinder 192b. As soon as the pressure sensor 185 in the sensor/solenoid valve 43 (as shown at 203b/45) determines that this pressure drop exceeds a preset amount it activates a solenoid switch mechanism 187 which in turn opens a gate 193 in valve body 186. The pressurized fluid, until now being applied against the driven load by the piston 27, is now provided with a path of minimal resistance through the opened valve 186, and on down a bypass tube 184. At the same time that the sensor 185 in the sensor/solenoid valve 43 caused the valve gate 193 in that sensor/solenoid valve 43 to open, it simultaneously caused the valve gate 193 in the sensor/solenoid valve 45 to open as well, thereby opening a clear passage into the upper cylinder 192. Thus the fluid to be evacuated from the lower cylinder 192b can enter the upper cylinder 192 freely and quickly. In this way, the wave follower is suddenly released of it's load resistance. As a result, the lower body portion of the wave follower which, until now has been held virtually out of and above the surface of the body of fluid as a result of the load resistance (having being designed to be just enough less than the gravitational force acting upon the wave follower to unlock the device and allow the wave follower to track the falling wave,) drops down to a point where the buoyant upper body is floating on top of the surface and the lower chamber is submerged. At this point the process begins over again. Once the wave follower 20 has "dropped" and the chamber 22 is re-submerged below the surface of the wave 52, the pressure sensor 185 detects a preset low pressure condition and the load on the wave follower 20 is re-established by re-closing the valve gates 193 of the sensor/solenoid valves 45 and 43.

The wave follower 20 further incorporates a counterweight 23 at an opposite end of and on another side of the fulcrum 24 of the lever arm 171 of the wave follower 20. This counter weight 23 serves to dynamically balance the wave follower 20 so that none of the buoyancy (potential energy) of the upper body 21 is converted and consumed to support the weight of the wave follower 20. Fixedly incorporated into the lever arm 171 of the wave follower 20 which moves more or less vertically up and down, is a diagonal, vertically oriented extension 172 which therefore, moves more or less horizontally back and forth. The conversion of wave motion to useable energy is accomplished in this embodiment of the invention by attaching a drive shaft 26 to the lever arm extension 172 by a pivotal joint 25 or similar attachment and then connecting the drive shaft 26 to a load, here represented by the pump assembly seen at 202a. and also by attaching a drive shaft 174 to the lever arm extension 172 by a pivotal joint 173 or similar attachment and then connecting the drive shaft 174 to a second load, here represented by the generator assembly seen at 202b. Thus, with the upward and downward movement of the wave follower 20 in reaction to the waves 67, the resulting back and forth motion of the lever arm extension 172, powers the driven devices. What is further illustrated in FIG. 2 is a preferred embodiment of the invention in which the drive shaft is utilized as a piston rod 26 to drive a reciprocating pump 202a. The reciprocating pump is comprised of the piston rod 26, piston 27, cylinder 28, foot valves 37 and 39, check valves 38 and 40, intake 36, outlet 41, pre-filter 35 and various plumbing fittings which will not be numerically identified. The pump is pivotally attached at 30 to the relatively immovable enclosure 47 of the apparatus 202 by mounting bracket 29 which allows the pump to rock backward and forward in order to maintain alignment with the piston rod 26. The piston rod 26, being attached to pivotal joint 25, allows piston rod 26 to stay aligned with the rest of the pump assembly as the lever arm extension 172 rocks back and forth. As the wave follower 20 rises, the piston 27 travels to it's left (toward it's nominal top) within the relatively immovable cylinder 28 creating a suction within the cylinder 28 below the piston 27. This action causes fluid to be pulled into this lower part of the cylinder 28 through the inlet at foot valve 37. As the piston 27 rises, thereby reducing the volumetric capacity in the upper part of the cylinder 28, the fluid contained within the upper part of the cylinder 28 above the piston 27 is pressurized and expelled through the outlet passing through the check valve 38 and through an outlet tube 41. As the wave follower 20 now travels downward, so does the piston 27, thus reversing the action within the cylinder 28. This now creates a suction within the cylinder 28 above the piston 27. This action causes water to be pulled into this upper part of the cylinder 28 through the inlet at foot valve 39. The fluid contained within the lower part of the cylinder 28 below the piston 27 is pressurized as the piston 27 is forced downward, reducing the volumetric capacity in this lower part of the cylinder 28 and is thus expelled through the outlet passing through check valve 40. The expelled, pressurized fluid from both the upward and downward strokes of the piston may then be gathered at 42 to power internal, external or separate and remote devices, systems or processes. In the event of larger than normal waves, the wave follower 20 is prevented from continuing it's upward travel into the pump 202a and the generator 202b and other undesirable areas by a stopper 31 which is fixedly attached at 32 to the enclosure 47 or some other appropriate immovable component of the assembly 202. Further, adequate clearance 33 is available on one or both sides of the stopper 31 to allow the surging fluid lifting the wave follower 20 to escape past the wave follower 20 when it has reached it's maximum allowable height, thus eliminating excessive stress and strains on the apparatus 202. A minimal clearance 34 between the wave follower 20 and the wave ramp 51 eliminates friction and wear to these components while at the same time, minimizing the passage of rising water past the wave follower 20 until such time as the wave follower 20 has reached the stopper 31. This clearance could be effectively eliminated altogether, if deemed worthwhile by the use of a flexible wiper gasket installed along the front and side edges of the wave follower 20.

Also, as with the pump 202a, the reciprocating lever arm extension 172 is linked to another drive shaft 174 by a pivotal joint 173. This joint 173 may be located at a point on the lever arm extension 172 which is either different from or the same as the pivotal joint 25 to which the pump 202a is connected. This drive shaft 174 is rotatably connected by bearings 119 to the threaded shaft 113 of a ball screw linear motion drive being the part of the assembly not including the generator 116 and as seen at 202b. As the threaded shaft 113 moves back and forth through an essentially immovable nut 110 on enclosed ball bearings, the threaded shaft 113 is forced to spin at high speed in reaction to the ball bearings interacting between the immovable threads of the nut 110 and the reciprocating threaded shaft 113. The nut 110 is rendered immovable in relation to the threaded shaft 113 by fixedly attaching it at 117 to a suitable anchoring point on the enclosure 47. The spinning threaded rod 113 interacts with a generator 116 to cause electricity to flow via wires 122 to a regulator/charger/battery assembly 70 which provides electricity via cables or wires 123 for remote needs 120 as well as for any internal needs such as for the integrated sensor/solenoid valve 43 and 45, this via wires 69 from the battery in assembly 70. The speed at which the threaded shaft 113 spins is determined by the lead angle, or threads per inch (or metre) formed or machined into the threaded shaft 113. The generator(s) 116, either singly or in plurality, are fixedly linked to the nut 110 such that current is generated on both the clockwise and the counter clockwise rotations of the threaded shaft 113 which is driving either the armature, the fields or other appropriate component(s) of the generator. Alternately, the threaded shaft 113 of the linear drive ball screw 202b may be fixedly connected to the drive shaft 174 at 119 and at or near another end, through an end support unit such that the threaded shaft 113 does not spin but nevertheless still causes the armature, fields or necessary components of the generator 116 to spin as the threaded shaft 113 travels back and forth through the generator 116.

Figure 4:
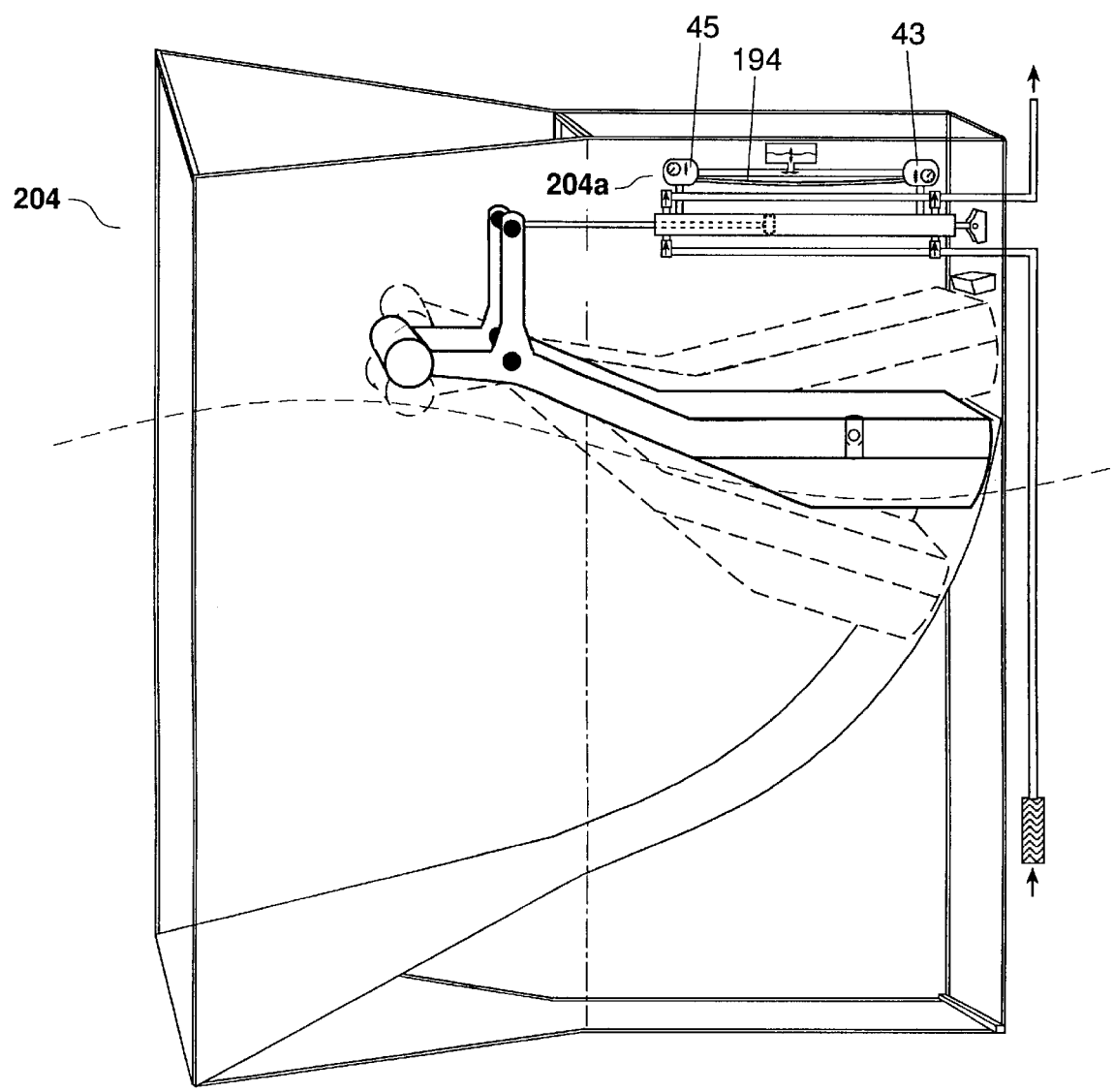
FIG. 4 shows a minor variation of the apparatus shown in FIG. 3 wherein a two-way reciprocating pump is a driven device and wherein solenoids/release valves/sensors/switches do not require electric power.

FIG. 4. describes a wave energy converter similar to that described in FIG. 2 except that it does not incorporate a generator/linear drive assembly (202b/FIG. 2). More specifically the wave energy converter as seen at 204 incorporates a sensor/solenoid valve 204a which differs from the previously discussed load release and re-establish means (202c/FIG. 3) only in that the signal cable (176/FIG. 3) is replaced by a pressure transmission tube 194 which is utilized to mechanically transmit the pressure at either one of the integrated sensor/release valves 43 and 45 to operate the valves in both, thus allowing for the use of a load release and re-establish means not requiring an electrical power source but instead some other source such as springs or compressed gas.

Figure 5:
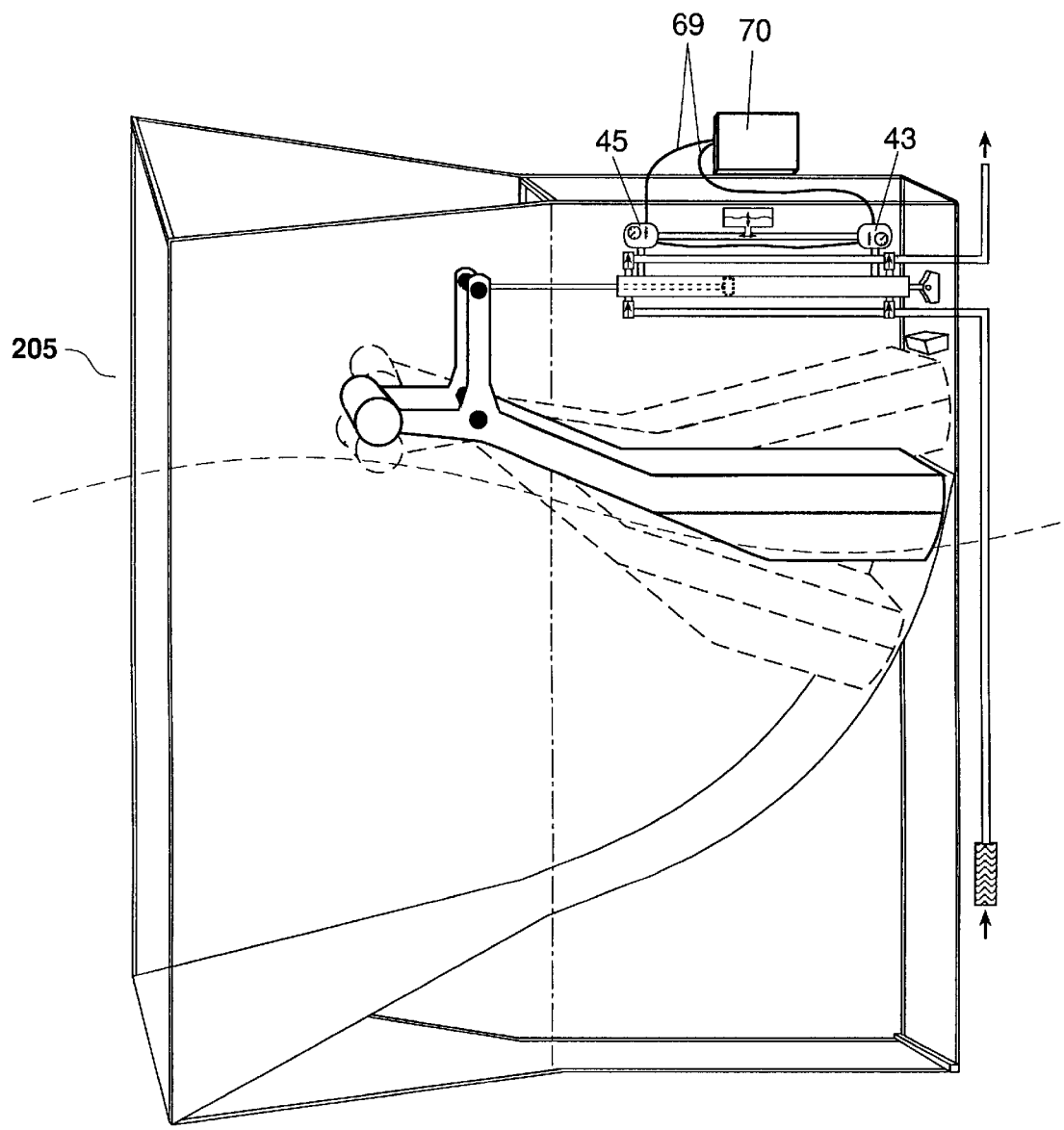
FIG. 5 is a detailed modified perspective view of a device similar to that in FIG. 4. excepting that the solenoids/release valves/sensors/switches are powered by an externally charged battery or other external source of power.

FIG. 5. describes a wave energy converter 205 similar to that described in FIG. 4 except that the sensor/solenoid valves 43 and 45 are electrically powered, receiving their power via cables 69 from a battery 70 which has been charged externally.

Figure 6:
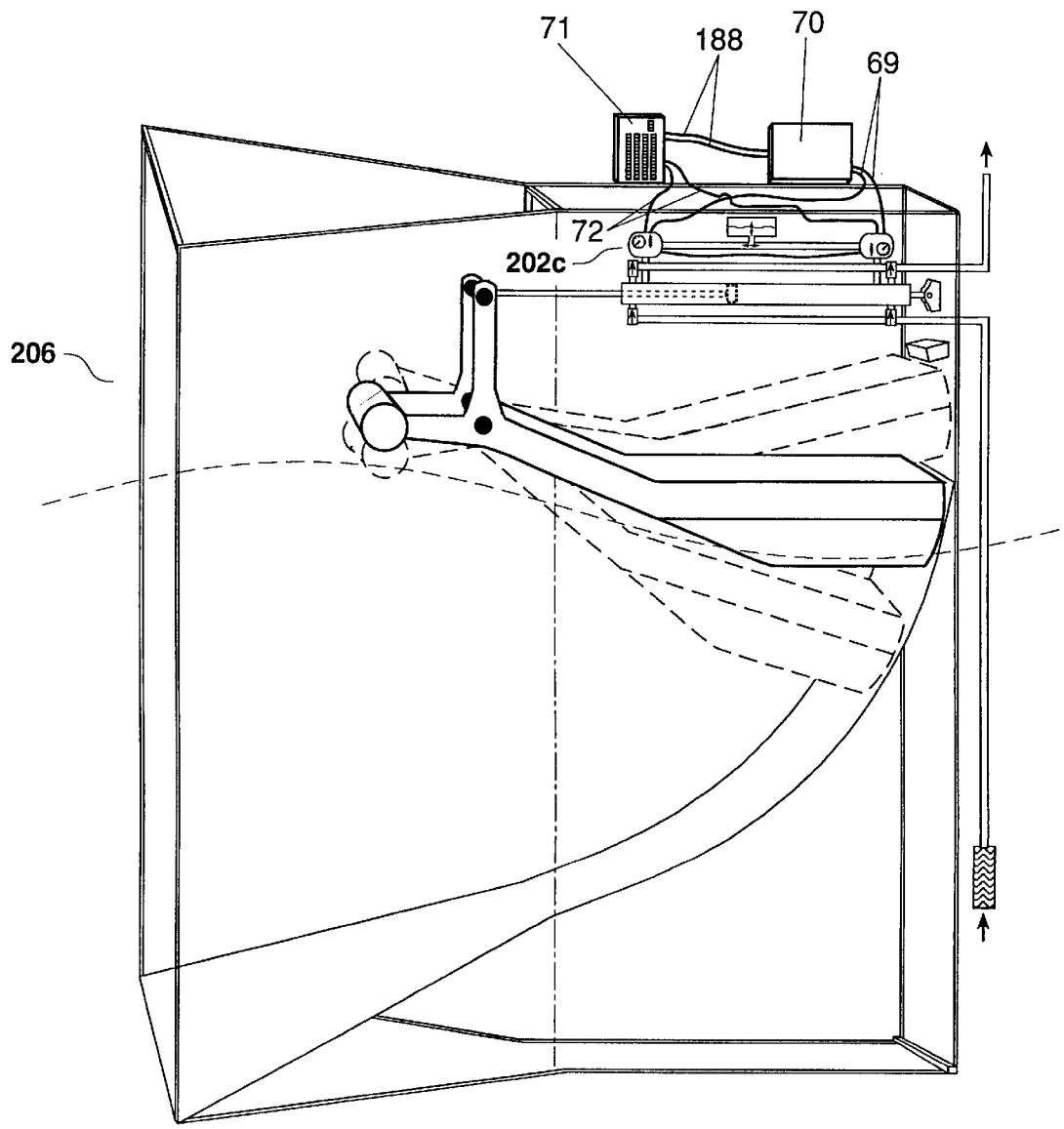
FIG. 6 is a detailed modified perspective view of a device similar to that in FIG. 4. excepting that the solenoids/release valves/sensors/switches are powered by internally or externally charged power (not shown) and wherein a programmable logic controller (PLC) is used to control the operation of the solenoids/release valves/sensors/switches.

FIG. 6. describes an apparatus 206 as described in FIG. 5 except that the functions of the load release and re-establish means are better controlled and site and conditions are adjustable through the use of a programmable logic controller (PLC) 71 via signal cables 72. The PLC 71 receives it's electric power via power cables 188 from the battery 70. The integrated sensor/switch/valve assemblies of the load release and re-establish means as seen at 202c also receive their electric power from the battery 70 via cables 69. This power may of course, also be furnished from other external sources or from internal generation such as is shown in FIG. 2.

Figure 7:
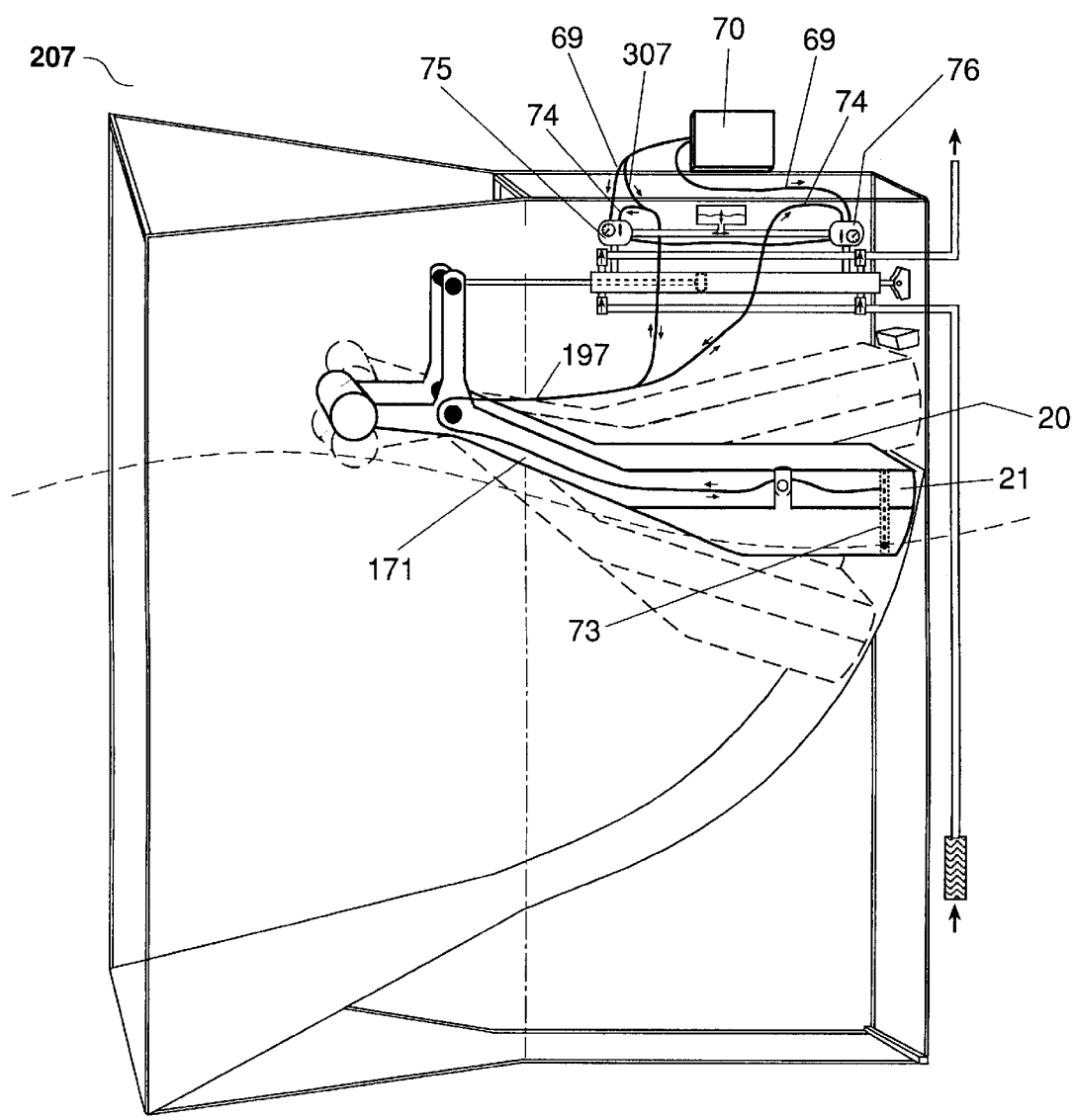
FIG. 7 is a detailed modified perspective view of a device similar to that in FIG. 4. excepting that sensors or senders are located in the wave follower, away from the pump and solenoid/release valve/switches.

FIG. 7. describes an apparatus 207 similar to that described in FIG. 6 except that it does not incorporate the optional PLC (71/FIG. 6) and more specifically, this embodiment of the invention places a water surface location sensor 73 in the wave follower 20 such that it responds to changes in wave height and direction as opposed to changes in wave follower height and direction. Thus the sensor 73 is able to transmit this information via wires 74 in the cable 197 which are housed inside the lever arm 171 of the wave follower 20 and are connected at another end to the solenoid switches in each of the switch/valve assemblies 75 and 76. The switch/valve assemblies 75 and 76 receive their power via power cables 69 from a battery 70. The sensor 73 also receives it's power from the battery 70 but via power cable 307 which may integrated into cable 197 as it runs through the lever arm 171 and upper portion 21 of the wave follower.

Figure 8:
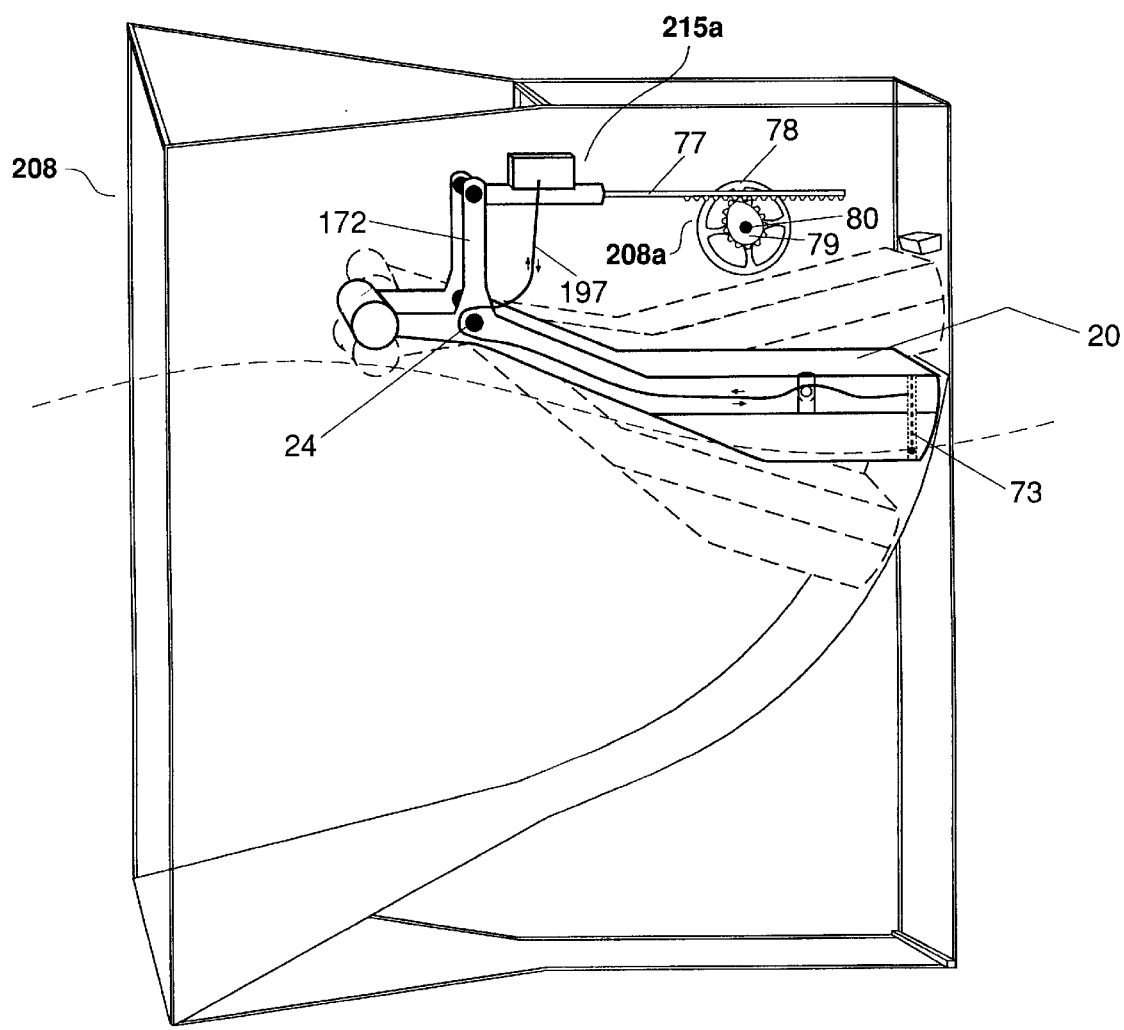
FIG. 8 is a modified perspective view of the upper portion of the apparatus shown in FIG. 1. wherein a rotary shaft means and flywheel are driven through a two-way reciprocating arc and wherein a geared cam reduces start-up load.

FIG. 8. also describes a wave energy converter 208 with a sensor 73 positioned in the wave follower 20. However, this unit differs in the type of load being driven. It is no longer incorporates a hydraulic pump or hydraulic load release and re-establish means. As the wave follower 20 rises and falls, thus rotating back and forth on an arc about it's fulcrum 24, the lever arm extensions 172 rock back and forth as was the case for previously described units in FIGS. 1 through 7. In this case the signal from the sensor 73 is transmitted via cable 197 to a mechanical load release and re-establish means 215a (further described in FIG. 17) which in turn drives a power transmission assembly as seen at 208a which, in this embodiment, incorporates a geared rack 77 driving a cam shaped pinion gear 79 which in turn rotates through a two-way reciprocating arc about a drive shaft 80. The drive shaft 80 then powers some driven device as represented by the wheel 78.

Figure 9:
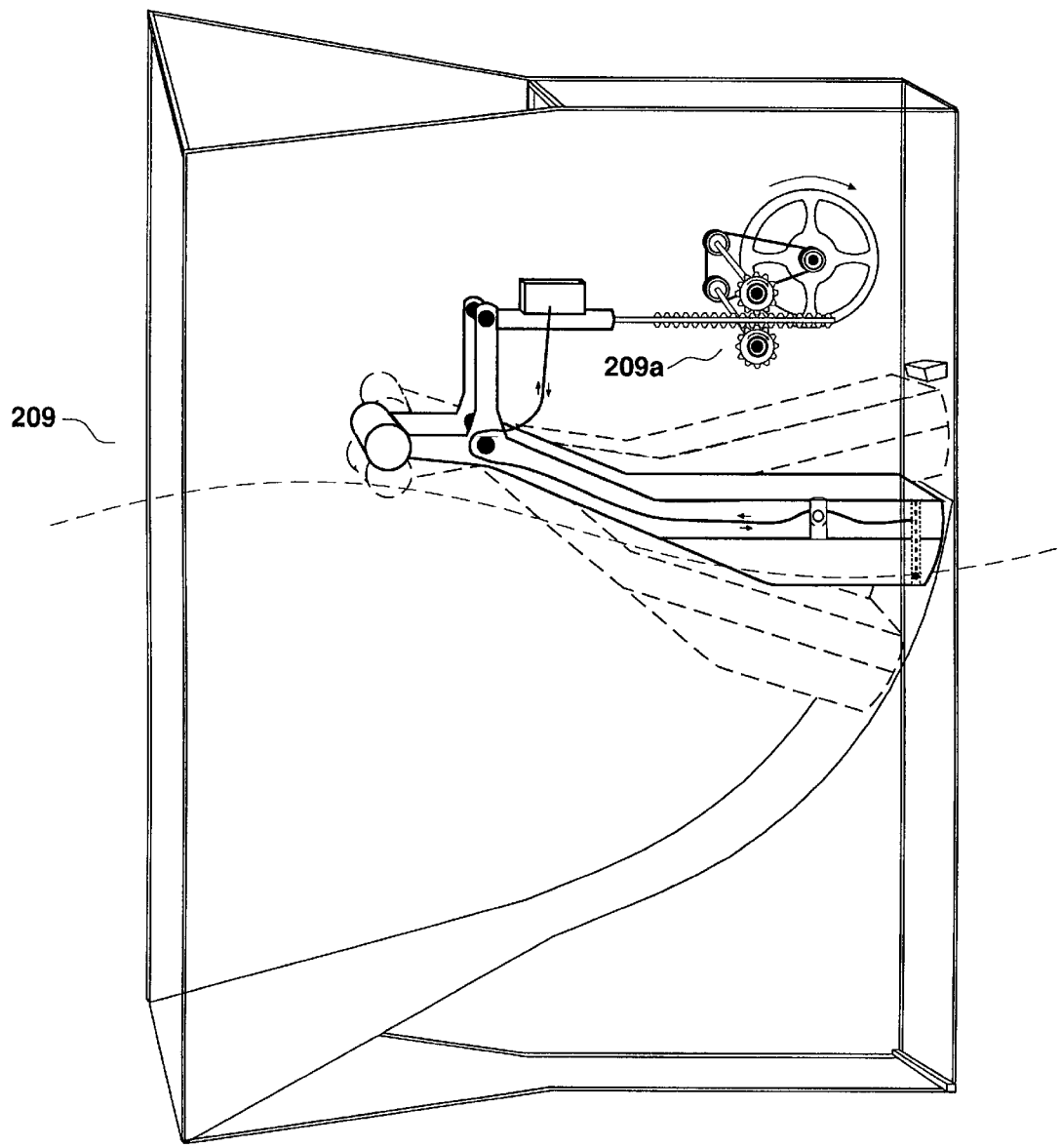
FIG. 9 is a modified perspective view of a device similar to that in FIG. 8, excepting that a geared cam is not used and a rotary shaft means and flywheel are driven through complete rotations.

FIG. 9. describes an apparatus as seen at 209 and which is very similar to that described in FIG. 8 except that the driven assembly as seen at 209a converts two-way reciprocating motion to full, continuous rotary motion in one direction. This driven assembly 209a is described in further detail in FIG. 15.

Figure 10:
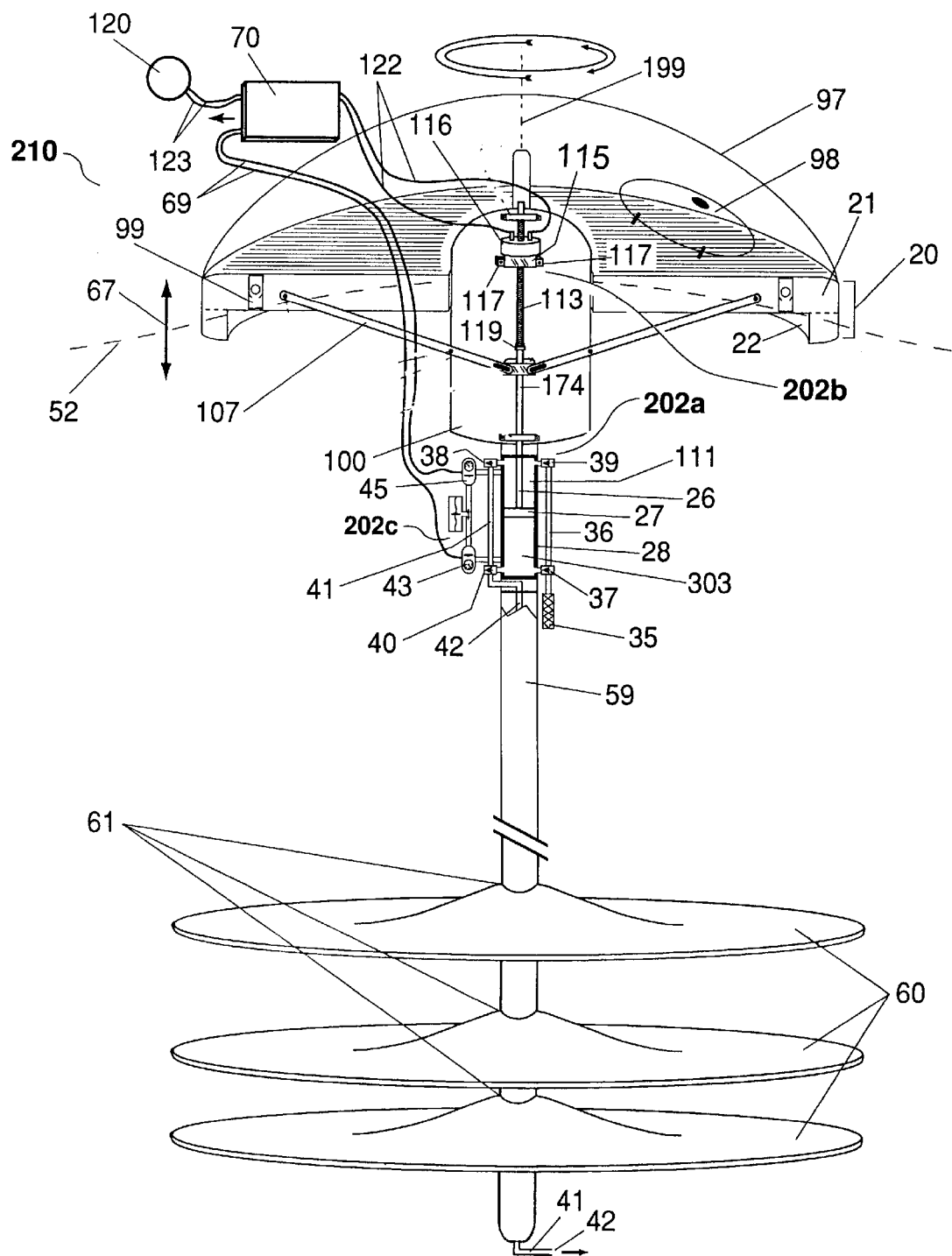
FIG. 10 is a modified perspective view of a floating Wave Energy Converter (non-enclosed or "open" style) without wave termination feature, or self-alignment feature but otherwise operationally equivalent to the apparatus shown in FIGS. 1 and 2, in accordance with a second preferred embodiment of the invention.

FIG. 10 describes a second preferred embodiment of the invention which is functionally similar to that described in FIG. 2. except that the enclosure 47/FIG. 2, funnelling panels 50/FIG. 2 and wave ramp 51/FIG. 2 are not present meaning that this embodiment of the invention does not capture wave surge energy to the same extent as the embodiment described in FIG. 2. The wave follower 20 is round in this embodiment as opposed to rectangular as depicted in FIG. 2. so as to be accessible to waves approaching from any direction. Also the floatation collar 58 as depicted in FIG. 1. is replaced with an inner floatation unit 100 which protrudes through the centre of the wave follower 20. Both the floatation collar 58/FIG. 1 and the inner floatation unit 100/FIG. 10 serve the same function in terms of the operating principles of the devices in that they both eliminate the need for the wave followers 20 to use up otherwise convertible energy by holding the complete apparatus afloat.

The wave follower 20 incorporates an upper body portion or flotation unit 21 which is made of any suitable buoyant material and a lower body portion 22, constructed in the form of a hollow chamber and having a complete or partial opening at its bottom. The lower body portion 22 is attached to the underside of the buoyant upper body portion 21, so that when the wave follower 20 is placed in fluid, the upper body portion 21 floats on the surface of the fluid 52, while the lower body 22 remains relatively submerged. A one-way check valve 99 is located in a passage in the buoyant upper body portion 21 for the purpose of allowing air to escape from the lower chamber 22. The operation of the wave follower 20 can be explained as follows. With the absence of waves on the surface of the fluid 52 and with the chamber 22 filled with fluid, the buoyant upper portion 21 of the wave follower 20 floats on the fluid and the lower portion 22 is submerged. However, on the rise of a wave (an upward stroke with regard to the wave follower), the buoyant upper body portion 21 (after overcoming the resistance of the loads 202a and 202b), tracks the rise of the wave. Since the fluid in the open bottomed lower chamber 22 is of the same density as the wave and is actually a part of that wave, work is only required to raise the buoyant upper body 21 of the wave follower 20. The fall of the wave starts the downward stroke of the wave follower 20 (again, after overcoming the resistance of the loads 202a and 202b). As the falling wave trough is tracked by the wave follower, fluid in the chamber 22 will attempt to flow out of the opening at the bottom of the chamber 22. The one-way check valve 99 which is closed at times of pressure equilibrium or pressure drop, prevents the free outflow of fluid from the chamber 22. As the wave falls and the fluid outside the chamber 22 begins to fall away, that fluid in the chamber 22, being now held above the level of that fluid outside the chamber, is pulled down. This suction effect, as well as surface adhesion between the fluid and the lower surface of the buoyant upper body portion 21 both pull the wave follower 20 down as the wave falls. The suction is created as the fluid tries to fall from the lower body portion 22 but cannot because of the now closed one-way check valve 99. The condition of surface adhesion is created as the fluid attempts to break its bond with the roof of the chamber of the lower body portion 22. If the lower body chamber 22 is not entirely filled with fluid because fluid has escaped during the fall of a previous wave (downward stroke with regard to the wave follower) or due to turbulence in the body of fluid, the rise of the next wave 52 causes fluid to attempt to re-enter the lower chamber 22 through the opening at its bottom, thereby causing an increase in pressure of the air contained between the fluid and the roof of the chamber 22. The increase in air pressure causes the one-way valve 99 to open, thus allowing air to be exhausted from the lower chamber 22 and, thereby, allowing fluid to freely once again enter and fill the lower chamber 22 through its open bottom. Throughout the above repeating cycle of rising and falling waves 52, the wave follower 20 continuously tracks these wave movements. In order to convert this potential energy to work or a useable form of energy it is necessary to cause the moving wave follower 20 to react with a more or less immovable device or component capable of doing work. This ability becomes further apparent in the following description.

Figure 11:
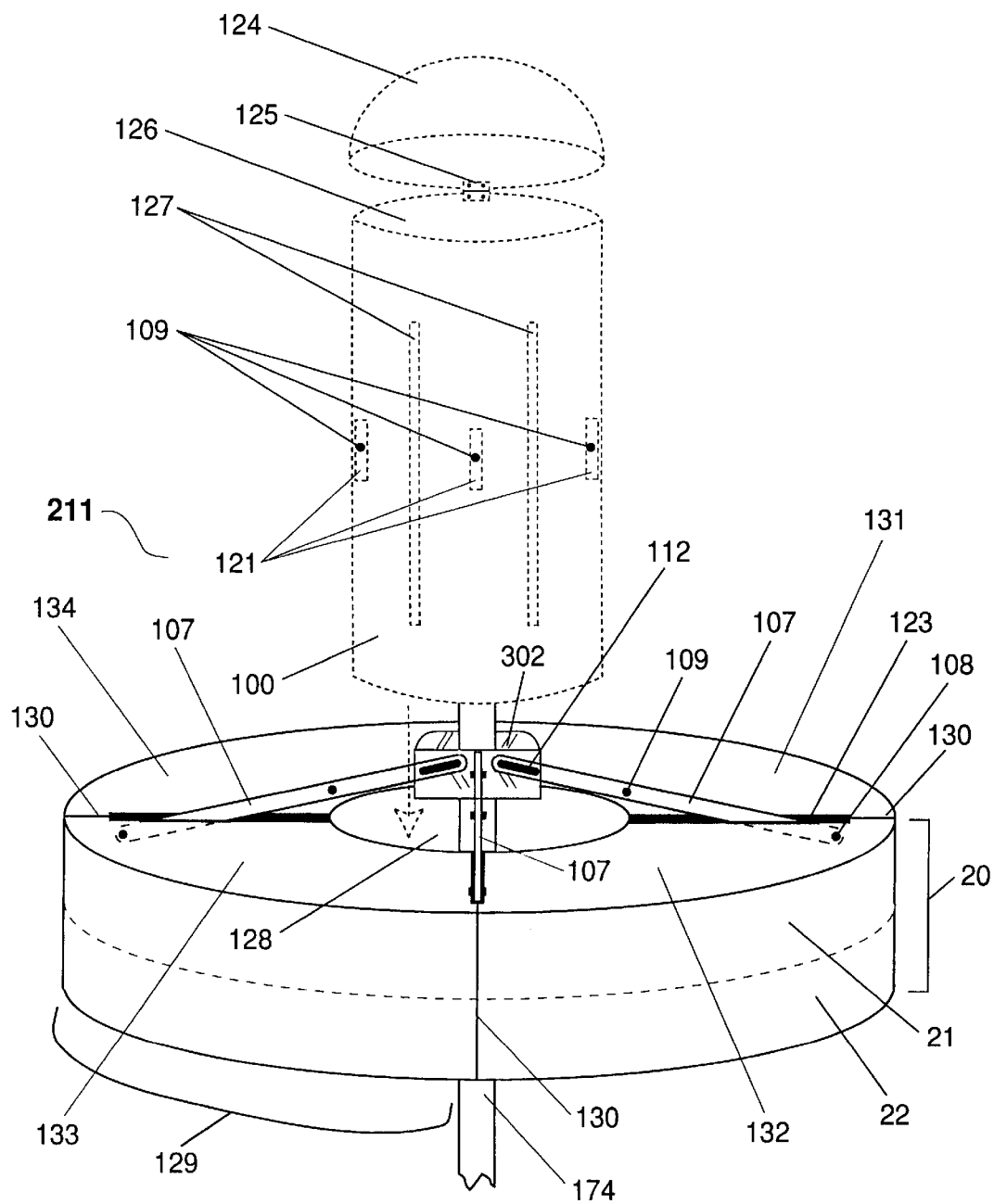
FIG. 11 is a more detailed, exploded perspective view of the upper portion of a floating "open" Wave Energy Converter described in FIG. 10 and showing the linkage setup for the lever arms as well as the wave follower being assembled from sections.

While FIG. 10 goes on to explain the further workings of the wave energy converter apparatus as seen at 210, it should be noted that FIG. 11 describes in greater detail how, in this embodiment of the invention, the linkage between the moving components and the essentially immovable components of the apparatus 210 makes possible the conversion of wave motion to useable energy.

What is further illustrated in FIG. 10 then is a drive shaft 174 extended such that it is utilized as a piston rod 26 to drive a reciprocating pump assembly 202a. The reciprocating pump is comprised of the piston rod 26, piston 27, cylinder 28, foot valves 37 and 39, check valves 38 and 40, intake 36, outlet 41, pre-filter 35 and various plumbing fittings which will not be numerically identified. The pump cylinder 28 is fixedly mounted into, or is simply a part of the tube which forms the support member 59 of the apparatus 210. As the wave follower 20 falls, the piston 27 travels upward within the relatively immovable cylinder 28 creating a suction within the cylinder 28 below the piston 27. This action causes fluid to be pulled into this lower part 303 of the cylinder 28 through the inlet at foot valve 37. Also as the piston 27 rises, thereby reducing the volumetric capacity in the upper part 111 of the cylinder 28, the fluid contained within the upper part 111 of the cylinder 28 above the piston 27 is pressurized and expelled through the outlet and check valve 38 and then through an outlet tube 41. As the wave follower 20 then reverses direction with the rising wave 52, the piston 27, changes its direction of travel, thus reversing the action within the cylinder 28. This now creates a suction within the cylinder 28 above the piston 27. This action causes water to be pulled into this upper part 111 of the cylinder 28 through the inlet at foot valve 39. The fluid contained within the lower part 303 of the cylinder 28 below the piston 27 is pressurized as the piston 27 is forced downward, reducing the volumetric capacity in this lower portion 303 of the cylinder 28 and is thus expelled through the outlet and check valve 40 and then through outlet tube 41. The expelled, pressurized fluid from the upward and downward strokes of the piston is gathered at 42 to power internal, external or separate and remote devices, systems or processes.

Also, as with the pump assembly 202a, the generator assembly 202b is connected to the drive shaft 174 which is rotatably connected by bearings 119 to the threaded shaft 113 of a linear drive ball screw being that part of the assembly 202b not including the generator component 116. As the threaded shaft 113 moves back and forth through an essentially immovable nut 115 which incorporates enclosed ball bearings, the threaded shaft 113 is forced to spin at high speed in reaction to the ball bearings interacting between the immovable threads of the nut 115 and the reciprocating threaded shaft 113. The nut 115 is rendered immovable in relation to the threaded shaft 113 by fixedly attaching it at points 117 to a suitable anchoring point on the inner floatation unit 100. The spinning threaded rod 113 interacts with a generator 116, also fixedly attached to the inner floatation unit 100, to cause electricity to flow via wires 122 to a regulator/charger/battery assembly 70 which provides electricity via cables or wires 123 for remote needs 120 as well as for any internal needs such as for the integrated sensor/solenoid valve 43 and 45, this via wires 69 from the battery in assembly 70. The speed at which the threaded shaft 113 spins is determined by the lead angle, or threads per inch (or metre) formed or machined into the threaded shaft 113. The generator(s) 116, either singly or in plurality, are designed and installed such that current is generated on both the clockwise and the counter clockwise rotations of the threaded shaft 113 which is driving either the armature, the fields or other appropriate component(s) of the generator 116. Alternately, the threaded shaft 113 of said linear drive ball screw component of the generator assembly 202b may be fixedly connected to the drive shaft 174 without the rotatable bearing 119 such that the threaded shaft 113 does not spin but nevertheless still causes the armature, fields or necessary components of the generator 116 to spin as the threaded shaft 113 travels back and forth through the generator 116.

Expanding further on FIG. 10, the load release and re-establish means presented at 202c is, due to it's novel function, capable of virtually doubling the output of the wave energy converter as seen at 210. This load release and re-establish means 202c is a hydraulic valving system which is just one of several possible load release and re-establish means configurations. A load release and re-establish means may be any hydraulic, pneumatic, mechanical, electro-mechanical or other means whose function is to momentarily release the wave follower 20 from the driven and systemic loads of the apparatus 202 such that the wave follower 20 is allowed to find its own level, or refloat itself, without the influence of these load resistances. Once the wave follower 20 has found its own level, the load is then re-established on the wave follower. This releasing and re-establishing of the load takes place both as a wave 52 approaches or reaches the highest point of its crest and begins to fall and also when a wave 52 reaches the lowest point of its trough and begins to rise. As the wave 52 approaches or reaches its highest point and no more work can be accomplished by the wave follower 20 moving upward, the sensing component of the load release and re-establish means 202c senses either the levelling off of a wave or the beginning of a change of direction of the wave or a drop in pressure in the upper portion 111 of cylinder 28 and releases the load on the wave follower 20. Any of these sensed changes cause activation of the load release and re-establish means 202c according to adjustable preset parameters. Because the force of the load on the wave follower 20 has caused the wave follower 20 to become virtually submerged as it tracked the rising wave, releasing that load allows the wave follower 20 to continue rising in that it "pops" up by a distance equal to the thickness of the buoyant upper portion 21 of the wave follower 20. While no work is accomplished during this "popping up," the wave follower 20 is, nonetheless, now positioned to benefit from extended working travel as it tracks the next falling wave 52. Once the wave follower 20 has "popped" and the buoyant upper body 21 is floating on the surface of the wave 52, the pressure sensor (185/FIG. 3-203b) detects a preset low pressure condition and the load on the wave follower 20 is re-established. Likewise, as the wave 52 approaches or reaches its lowest point and no more work can be accomplished by the wave follower 20 moving downward, the load release and re-establish means 202c senses either the levelling off of, or the beginning of a change of direction of the wave, or a drop in pressure (now in the lower portion 303) of cylinder 28 and again releases the load on the wave follower 20. Because the resistance of the load on the wave follower 20 has caused the wave follower 20 to be held above the body of fluid to a height nearly that of the thickness of chamber 22 as it tracked the falling wave, releasing that load allows the wave follower 20 to continue descending, even as the wave reaches its lowest level, in that the wave follower 20 "drops" down (due to gravity pulling on that water in the lower chamber 22 held above the level of the wave) by the thickness of the chamber 22. While no work is accomplished during this "dropping," the wave follower 20 is, nonetheless, now positioned to benefit from extended work producing travel as it tracks the next rising wave 52, to begin the cycle again. Once the wave follower 20 has "dropped" and the chamber 22 is re-submerged below the surface of the wave 52, the load on the wave follower 20 is re-established by re-closing the sensor/solenoid valves 45 and 43. The load discussed above is made up of that resistance set up by the pump assembly 202a and the linear drive/generator assembly 202b. In this way the output from a wave energy converter incorporating such a load release and re-establish means can be increased in the range of double that of a similar device not so equipped.

A more detailed view of the pump assembly 202a and more particularly the load release and re-establish means 202c have previously been explained in FIG. 3.

Also a more detailed view of one of the integrated sensor/switch/valves 45 has previously been explained at 203a in FIG. 3.

Expanding further on FIG. 10, fixedly attached at or near a lower end of the support member 59 at point 61 are a plurality of unequally spaced heave reaction plates 60 which are employed to prevent the apparatus 210; with the exception of the wave follower 20, lever arms 107 and their associated linkages and the driven devices 202a and 202b; from moving up and down with the rising and falling waves 52. These unequally spaced heave reaction plates 60 are further explained in FIG. 11.

Fixedly attached to the top of the wave follower 20 is a dome shaped enclosure 97 which may or may not be impermeable. The purpose of this domed enclosure 97 is fourfold. First, it prevents pinnipeds, such as seals, from nesting or resting atop the apparatus 210, thus causing reduced apparatus efficiency and creating potential environmental issues. Secondly, the dome's conical shape is such that it will deflect the forces of unusually large waves which may crash down upon the apparatus 210 from time to time. Thirdly, it prevents water from pooling on top of the wave follower 20, thereby causing reduced efficiency and fourthly, it serves as a safety barrier for service personnel who may be atop the apparatus 210. An openable porthole 98 is installed in the domed enclosure 97 to allow for convenient access and egress.

FIG. 11. provides a more detailed, exploded view of how the wave follower 20 and lever arms 107 of the apparatus 210/FIG. 10 are linked to the drive shaft 174, as well as providing further detail on the interaction between, and construction and features of, the wave follower 20 and the inner floatation unit 100.

While the wave follower 20, including the buoyant upper portion 21 and the lower ballast chamber 22 may be moulded, formed or otherwise produced as a single, dual or multiple component assembly, this embodiment presents a wave follower 20 which is an assembly of four sections 131, 132, 133, 134, each incorporating a buoyant upper portion 21 and a lower ballast chamber 22. These sections are fixedly attached to one another at their side faces at 130 such that they form a round disk with a hole 128 through its centre. These sections 131, 132, 133, 134 are formed such that slots 123, extend along the joint lines 130, said slots extending from the centre hole 128 some distance outward but not the complete distance toward the outer edge of the wave follower 20. These slots 123 are such a width as to allow lever arms 107 to move up and down freely within them. A lever arm 107 is attached in each of the slots 123 to the wave follower 20 by a trunnion pin 108 or some other similar means providing for vertical pivoting of the lever arms within the slots 123. The trunnion pin 108 is fixedly attached to each of the two wave follower sections on either side of the slot 123. This is repeated at all of the four joints 130. The lever arms 107 pass through other slots 121 found in the inner floatation unit 100 and are pivotally attached at a sliding bearing slot 112 at another end to a trunnion block 302. The trunnion block 302 is fixedly attached to a reciprocating drive shaft 174 whose function has been explained in FIG. 10. At a point between where the lever arm 107 is attached to the trunnion block 302 and to the wave follower 20 at trunnion pin 108, said lever arm 107 is also pivotally attached by yet another trunnion pin 109 or similar device to the inner floatation unit 100. These trunnion pins 109 are located in each of the slots 121 in the inner floatation unit 100 where the lever arm 107 passes through said inner floatation unit 100. The trunnion pins serve as immovable fulcrums about which the lever arms 107 may operate and are located at a point in the lever arms 107 such that a mechanical advantage can be achieved due to there being a greater distance between the trunnion pins 108 and 109 than between the trunnion block 302 and trunnion pin 109. The mechanical advantage gained by this leverage allows the force of the rising and falling wave follower 20 to be increased on the reciprocating drive shaft 174 in order that a greater pressure may be achieved in the hydraulic pumping cylinder 28/FIG. 10. In this embodiment as seen at 211 in FIG. 11, said pivoting of the lever arms 107 results in the drive shaft 174 being driven downward more or less one unit in distance when the wave follower 20 rises two units in distance. In the event of larger than normal waves, the wave follower 20 is prevented by stoppers 304, located at the tops and bottoms of the lever slots 121, from over-extending the travel of the drive shaft 174 to the point where damage might be caused to the pump 202a/FIG. 10, the generator 202b/FIG. 10 or other sensitive components. Fixedly attached to the inner floatation unit 100 are vertically oriented slider bars 127 whose purpose is to minimize friction and wear to the wave follower 20 and the inner floatation unit 100 as the wave follower 20 continuously moves up and down in relation to the inner floatation unit 100. The inner floatation unit 100 also serves as a housing or enclosure for the various linkages, driven devices, and plumbing already discussed as well as for other possible components such as, but not limited to, controls. In order to facilitate access to these components, assemblies and devices, the inner floatation unit 100 is comprised of an openable upper portion 124 and a main body portion 126 are re-closable and latched such that, when closed, the chamber within the inner floatation unit 100 is sealed, as much as possible, against the corroding effects of excessive moisture and salt water mist.

Figure 12:
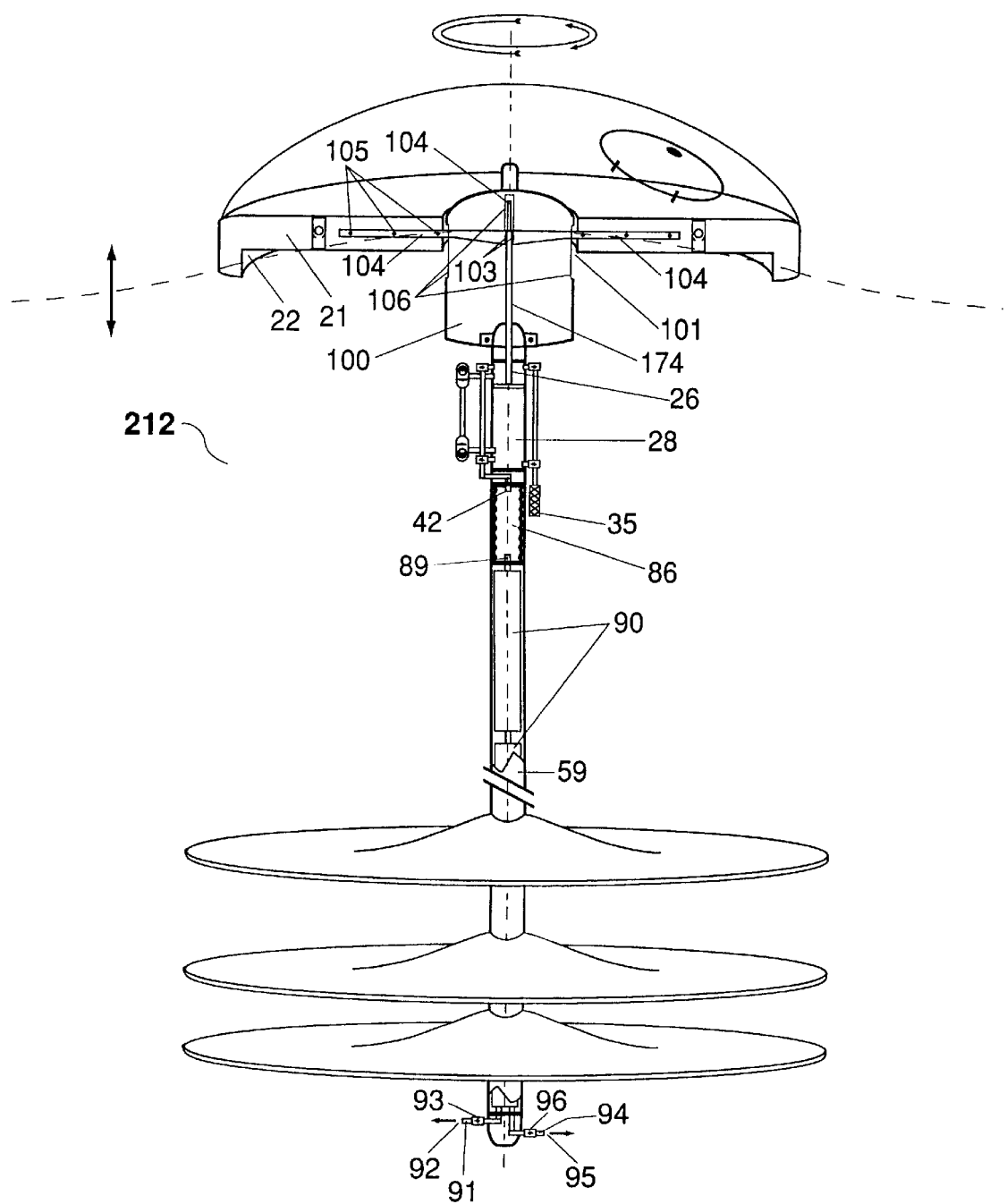
FIG. 12 is a modified perspective view of a floating Wave Energy Converter similar to the apparatus shown in FIGS. 10, but without lever arm linkages and also incorporating on-board reverse osmosis or mechanical pressure filtration capability (which the apparatus on FIG. 10 could also be rigged with).

FIG. 12. describes a unit similar to that described in FIGS. 10 and 11 except that the lever arms are replaced with a simple direct connection to the drive shaft 174 so that no mechanical advantage from leverage is provided. This configuration would be used where lower pumping pressures are acceptable. The lever arms 107/FIG. 11 are replaced with connector arms 104 which are fixedly attached with fasteners 105 to the wave follower 20 and pass through slots 106 in the inner floatation unit 100 to points 103 where they are fixedly attached to a drive shaft 174. The slots 106/FIG. 12 differ from the slots 121 FIG. 11 in that they do not incorporate any fulcrum for leverage. As the rising and falling wave follower 20 drives the drive shaft 174 up and down by virtue of the connector arms, the drive shaft 174 which, in this embodiment of the invention, is an extension of a piston rod 26, drives that piston rod 26 and a fixedly attached piston 27 in a cylinder 28 such that these components work together to form a reciprocating pump which works on both the up and down strokes caused by the rising and falling waves 52. This pumping action is essentially the same as that described in FIG. 10.

FIG. 12. goes on to describe an apparatus as seen at 212 wherein a reverse osmosis filtration system has been integrated into the tubular support member 59 of the apparatus 212. As the pressurized fluid, being sea water, brackish water or polluted water in this case, is expelled from the outlet tube 41, it passes into an accumulator 86, which may have one or more stages and whose purpose is to smooth out spikes and variations in pressure which occur each time the piston 27 changes direction. This constantly pressurized water then passes from the accumulator 86 through a check valve 89 into one or a series of commercially available, membrane type, reverse osmosis tube assemblies 90 which prevent dissolved salts, minerals and other unwanted contaminants from transferring through their membranes. The fresh water which permeates the filter is carried through an extraction tube 94 through a check valve 96 and is then gathered for use in a variety of possible ways at 95. The portion of the water which does not transfer through the membranes, returns with the non-transferred dissolved materials via another outlet tube 91 through a check valve 93 to return to its source at 92 or to pass through an energy recovery system which harnesses and recycles most of the excess pressure from the system to increase overall device efficiency. Suspended particles and other unwanted material which could damage or clog the reverse osmosis assembly 90, valves or pump are largely filtered out by any of a combination of strainers and pre-filters installed at the water intake to the pumping system, seen here as an integrated strainer/pre-filter 35.

Figure 13:
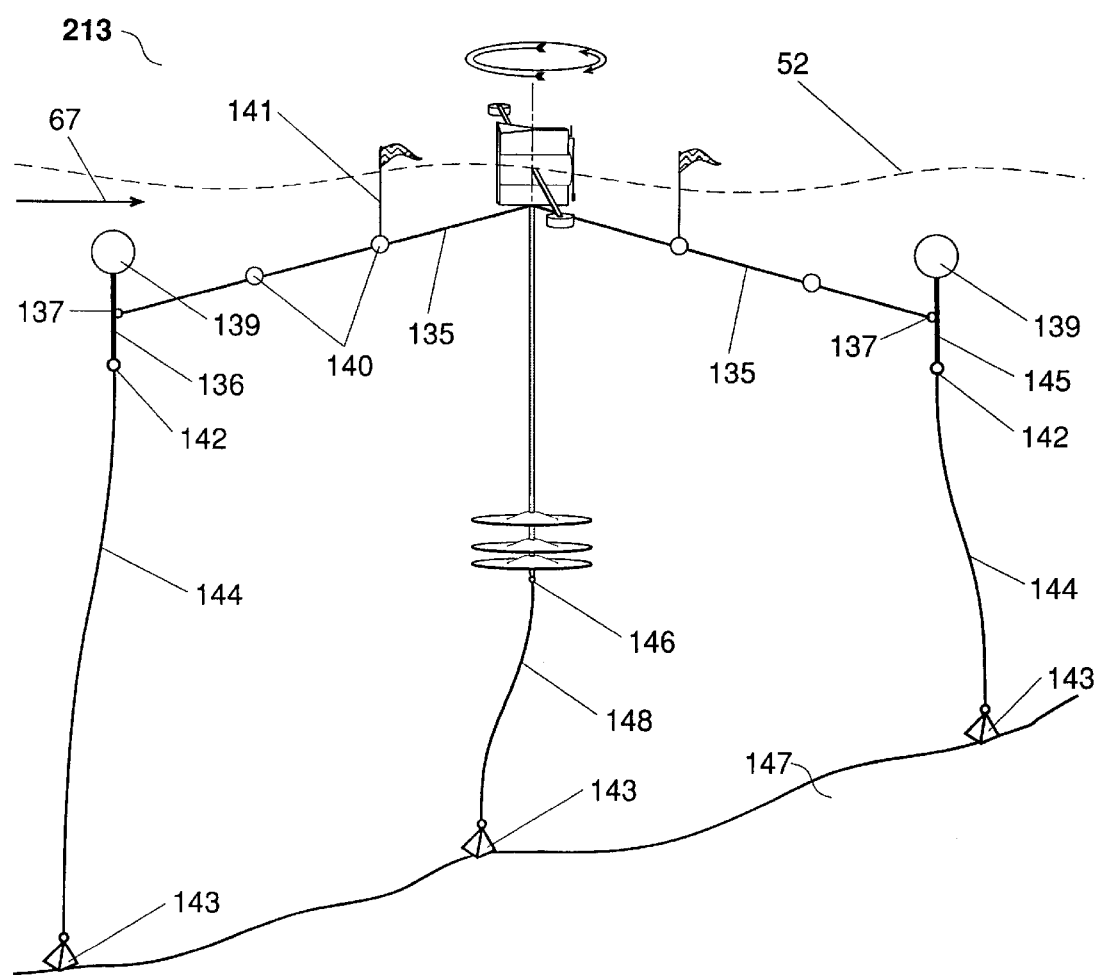
FIG. 13 is a modified perspective view of a floating Wave Energy Converter incorporating a wave termination feature, self-alignment feature, unequally spaced heave reaction plates feature as in FIG. 1 and wherein remote, flexibly attached surge reaction plates are utilized.

FIG. 13. describes a wave energy converter 213 (as seen at 201 in FIG. 1) wherein potential back and forth movement of the wave energy converter 213 caused by the surge of oncoming waves 67 is minimized by the use of remote flexibly attached, vertically oriented surge reaction plates 136 and 145. Fixedly attached to apparatus 213, guy wires 135 extend frontward and rearward perpendicular to the front of the oncoming wave. These guy wires 135 are in turn fixedly attached to reaction plate 136 by a mooring eye 137 and also to reaction plate 145 by another mooring eye 137. The vertical reaction plates 136 and 145, being situated below any significant wave action are thus not subject to lateral forces synchronous with those acting on the wave energy converter 213 and because of their significant surface area, resist being pulled laterally, thereby greatly reducing lateral movement of the wave energy converter 213 in response to wave surges. These vertical reaction plates 136 and 145 are held in an upright position, or perpendicular to the surface of the fluid body 52, by fixedly attaching a buoyant float such as a hollow sphere 139 to their upper end. As these float 139 attempts to pull the reaction plates 136 and 145 upward to the surface 52 of the fluid body, the reaction plates 136 and 145 are prevented from doing so by anchor cables 144 which are fixedly attached to anchors 143 firmly in place on the earth or floor 147 beneath the body of fluid, the anchors 143 being attached to the forward reaction plate 136 by a mooring eye 142 and to the rearward reaction plate 145 by another mooring eye 142. In this way the reaction plates are held essentially vertical. The length of the anchor cables 144 is such that the floats 139 cannot reach the surface 52 and therefore, always keep the plates 136 and 145 in a relatively vertical position. The effect of gravity on the guy wires 135 is offset by the attachment of small, appropriately sized floats 140 to the guy wires, these floats 140 being rigged, where necessary, with warning flags 141 for the benefit of approaching vessels. The wave energy converter 213 is anchored by an anchor 143 which is fixedly attached to the wave energy converter at a mooring eye 146 by an anchor cable 148.

Figure 14:
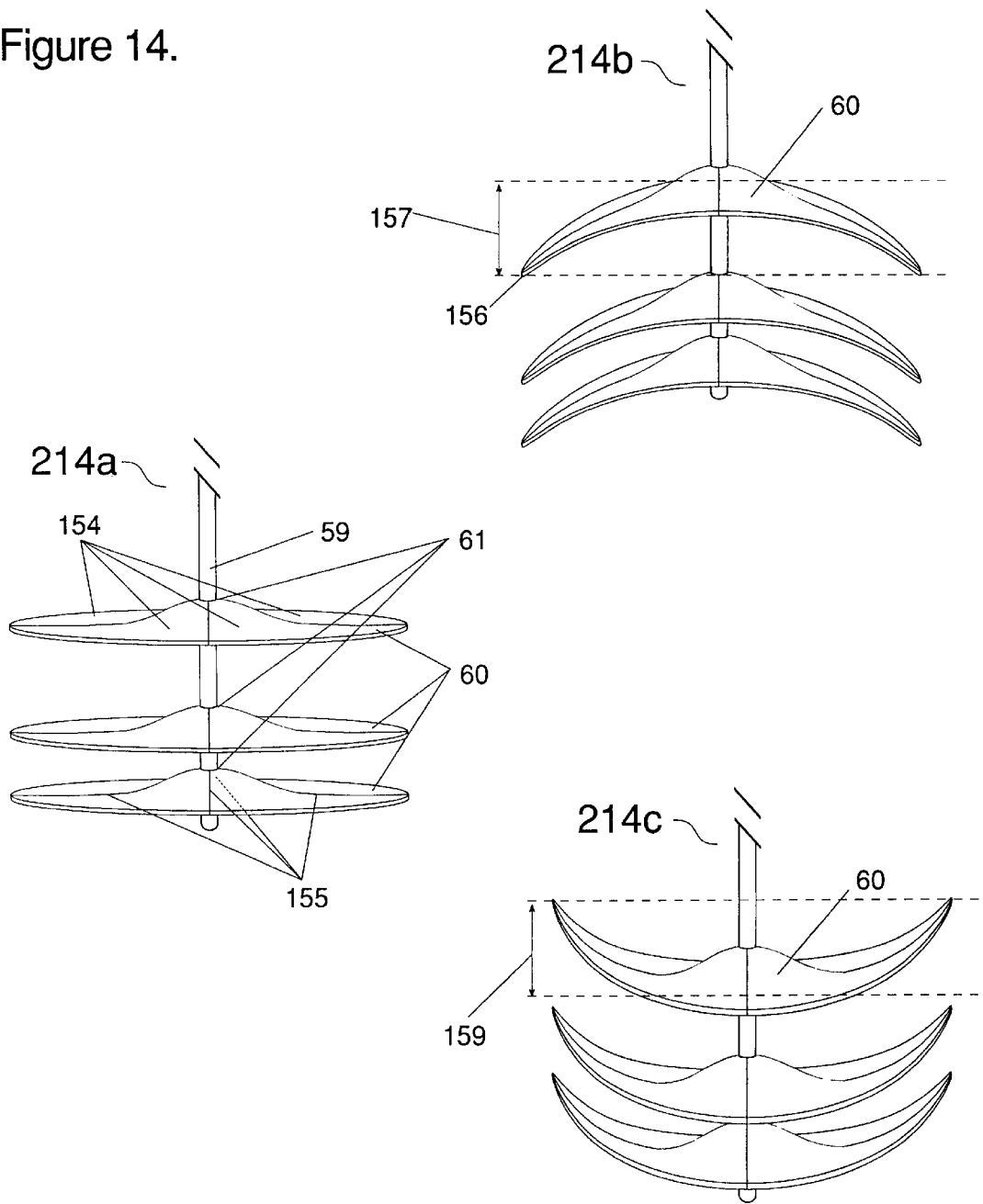
FIG. 14 is a still more detailed modified perspective view of the submerged unequally spaced, self-furling reaction plates of the floating Wave Energy Converter in accordance with the preferred embodiments of the invention.

FIG. 14. describes the design of self-furling heave reaction plates as are optionally used to minimize or eliminate the up and down movement of wave energy converters ( except for the wave follower) in relation to the rising and falling waves. At 214a is seen a set of three reaction plates 60 which are fixedly and immovably attached at 61 to the support member 59 of a floating wave energy converter. Each disc shaped reaction plate is actually comprised of a plurality of sections 154 which are connected to each other or overlap each other at 155 such that distortion of the sections 154 is possible. The reaction plates 60 are purposely spaced such that the distances between them are unequal, this being for the purpose of overcoming harmonic up and down movement in the body of fluid in which they are placed and thus reducing the up and down movement of the wave energy converter in reaction to this harmonic movement within the body of fluid in the area of the reaction plates 60. The self-furling feature of the reaction plates is evident at 214b wherein a sudden and unusually large upward force lifts the wave energy converter more rapidly than should occur thus threatening its structural integrity. The outer edges 156 of the reaction plates 60, being thinner than towards the centre, are engineered to flex or bend downward 157 to allow the apparatus to then rise with the unusual upward force, thereby escaping structural damage. The plates then return to normal when the unusual upward force passes. Likewise, as seen at 214c, the reaction plates 60 flex upward 159 in reaction to unusually large and sudden downward forces being applied to the wave energy converter.

Figure 15:
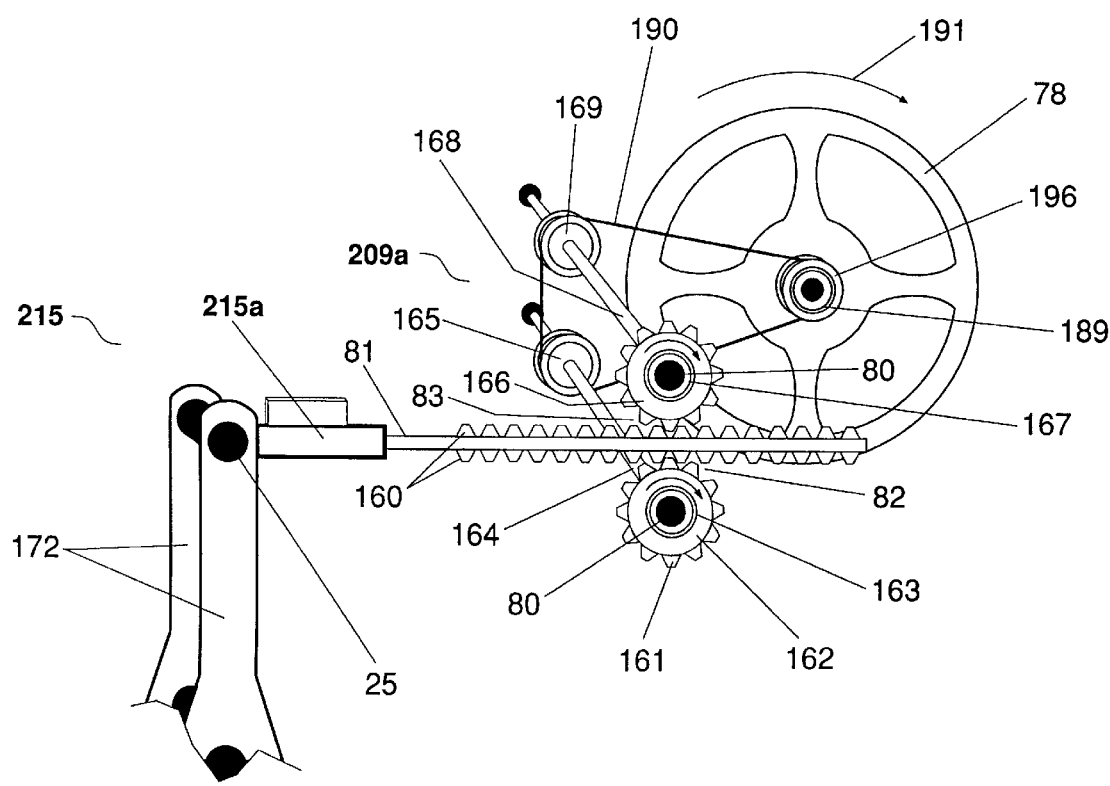
FIG. 15 is a still more detailed modified perspective view of the sub-assembly shown in FIG. 9 used to convert two-way reciprocating lateral motion to full rotary motion in one direction in a fashion which overcomes the problem of variable wave frequency working against the apparatus.

FIG. 15. is a more detailed description of the fully rotating shaft and its gear and linkage assembly as seen in FIG. 9 at 209a and here at 215. As the lever arm extensions 172 rock back and forth they transfer the same action to a rack 81 with gear teeth 160 on both its upper and lower sides. These teeth mesh with and drive, at 82, a toothed 161 sprocket 162 which turns a rotatable shaft 164. Mounted into the sprocket 162 and interacting with the shaft 164 is an overrunning clutch 163 which causes the shaft 164 to be driven clockwise when the rack 81 rocks forward but which slips or overruns the shaft 164 when the rack 81 rocks backward. Alternately, when the rack 81 does rock backward, the upper teeth 160 mesh with the teeth of an upper sprocket 166 at 83 which turns another rotatable shaft 168, also in a clockwise direction. The upper sprocket 166 is also fitted with an overrunning clutch 167 which insures that only clockwise rotational forces are applied to the upper shaft 168. The lower shaft 164 and the upper shaft 168 are fitted with fixedly attached pulleys 165 and 169 respectively. These pulleys, both turning clockwise, drive a belt (or chain) 190 which in turn drives a pulley 196 fitted with another overrunning clutch 189 which drives a driven member as represented by 78 in a clockwise direction 191. The rack 81 is linked to the lever arm extension 172 by a pivotal joint 25, said link being through a mechanical load release and re-establish means 216a (further described in FIG. 17). Other transmission means may also be used to accomplish this same outcome.

Figure 16:
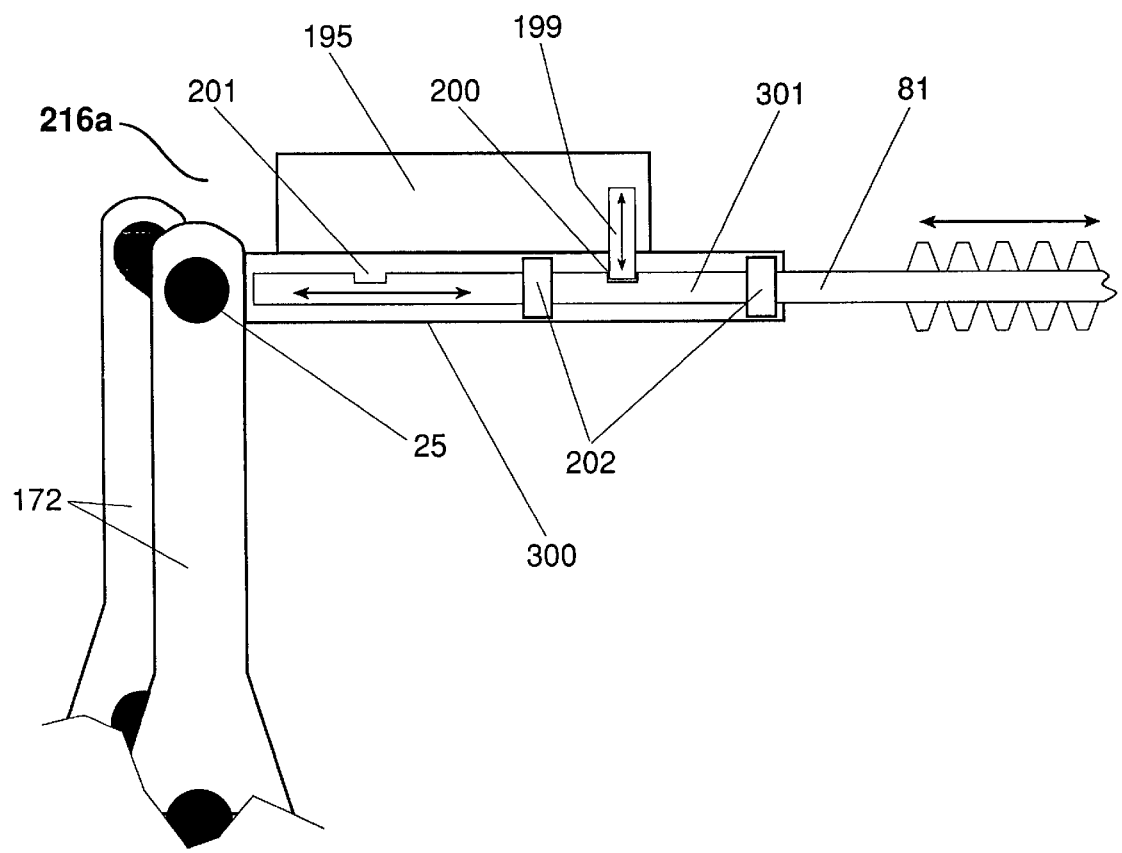
FIG. 16 is a detailed perspective view of a mechanical load release and re-establish means which might be used in place of the hydraulic mechanisms more fully described in the specification.

FIG. 16. describes a mechanical load release and re-establish means wherein a solenoid switch 195 momentarily withdraws and then reapplies a solid pin 199 or other such member into a slot or keyway 200 in an extension 301 of the rack 81 such that the rack 81 is freed to slide laterally a given distance before the pin 199 is forced back into a second keyway 201 by the solenoid switch 195. The extension 301 of the rack 81 is mounted in bearings 202 which are in turn fixedly mounted inside a sleeve 300. These bearings 202 allow the extension 301 of the rack 81 to travel back and forth in the sleeve 300 when the solenoid pin 199 is withdrawn, thus releasing the load (as was the case described in FIG. 2) applied to the rack 81 by the wave follower lever arm extensions 172 which are rotatably connected to the sleeve 300 by a pivotal joint 25.

While other means may be used to make possible this release and re-establishment of load or "pop and drop" capability, as has been previously described, the means of implementation is less important than the implementation itself. It is the implementation rather than the specific means of releasing (several of which exist in industrial applications) which is novel with regard to this invention.

The embodiments of the invention in which an exclusive property or privilege is claimed are defined as follows:

1. An apparatus for converting the motion of waves on a body of fluid to useable energy comprising:

wave follower means for tracking the rise and fall of waves on a body of fluid, said wave follower means comprising a buoyant upper body portion for tracking the rise of said waves and a ballasted, lower body portion for tracking the fall of said waves;

drive transfer means to power a driven device and actuated by the reciprocating forces exerted by said wave follower means;

load release and re-establish means for eliminating or releasing the load or resistance created by said driven device and for re-establishing said load; for the purpose of increasing travel of said wave follower means thereby increasing apparatus efficiency.

2. A device as defined in claim 1, wherein said load release and re-establish means functions, first by releasing said load, thereby allowing the potential energy stored as buoyant force acting on said buoyant upper body portion, when submerged, to refloat said wave follower means after said load has been released, then by re-establishing said load after said buoyant upper body portion has been re-floated; and second by releasing said load, thereby allowing the potential energy stored as gravitational force acting on said ballasted, lower body portion, when partially suspended in air, to re-submerge said ballasted lower body portion of said wave follower means after said load has been released, then by re-establishing said load after said ballasted, lower body portion of said wave follower means has been re-submerged; for the purpose of increasing the effective, working travel of said wave follower means.

3. A device as defined in claim 2, wherein said apparatus comprises:

rotatable support means which floats in a body of fluid, wherein said rotatable support means may further incorporate a fixedly attached component reaching downward to a point below that which any significant wave action occurs, and wherein said fixedly attached component may be a tube, pipe or cylinder into which components including, a piston rod, piston, accumulator, filters or reverse osmosis membranes may be assembled and wherein said fixedly attached component may be fixedly attached at or near its lower end to a reaction component for the purpose of eliminating or reducing reaction to the heaving of waves;

said drive transfer means linking said wave follower means and said driven device, the drive transfer means being lever arms which can determine mechanical advantage, said lever arm means being pivotally attached at a fulcrum to said rotatable support means;

unequally spaced, horizontal reaction plate means for holding said support means substantially stationary relative to the rise and fall of said wave follower and said waves;

floatation means to render said support means buoyant in order to eliminate the need for said wave follower means to provide buoyancy to said apparatus, said floatation means to move said apparatus up and down with the tides but not with the waves.

4. A device as defined in claim 2, wherein said apparatus comprises:

mechanical advantage modifier means, which allows said apparatus to progressively vary the mechanical advantage to said drive transfer means throughout both strokes in the reciprocating cycle and in a way which reduces the force required, with each change of stroke direction, for said driven device to unlock and thereby function, albeit at reduced output in smaller waves, thereby harnessing energy that would otherwise have been lost.

5. A device as defined in claim 3, wherein said apparatus comprises:

self-furling reaction plate means for holding said support means substantially stationary relative to the rise and fall of said wave follower means and said waves, wherein said self-furling reaction plates means are selectively and progressively more flexible, toward their outer edges, as are some windmill propeller blades; this feature being provided to allow said apparatus to atypically heave or roll rather than break when subjected to extreme forces.

6. A device as defined in claim 3, wherein said apparatus comprises:

linked global positioning system and propulsion system means for the purpose of maintaining the position of said apparatus, if not anchored, or directing said apparatus to move to a specified location or come ashore even when un-manned, or locating said apparatus if forced or otherwise moved away from its expected geographic position.

7. A device as defined in claim 3, wherein said apparatus comprises:

vertically oriented surge reaction plates means positioned both in front of and behind said apparatus and below water level at a depth beyond any significant wave action; said vertically oriented surge reaction plates being buoyed up and anchored and secured to said apparatus by means of cables, for the purpose of stabilizing said apparatus against lateral wave motion.

8. A device as defined in claim 3, wherein said apparatus comprises:

outrigger reactor means, for the purpose of keeping the front of said apparatus aligned with incoming waves, said outrigger reactor means being fixedly attached to said rotatable support means by arms and extending out from the sides of said rotatable support means and wherein alignment occurs due to less force being required to rotate said apparatus than to lift one of said reactor means.

9. A device as defined in claim 3, wherein said apparatus comprises:

dome attached to the top of said wave follower for the following purposes: prevention of pinnipeds or other creatures from resting or establishing habitation on said wave follower; deflecting downward forces; shedding of water from said wave follower, thereby improving device efficiency and protection of maintenance personnel.

10. A device as defined in claim 2, wherein said apparatus comprises:
- wave follower means comprising an upper body portion for tracking the rise of said waves and a lower body portion for tracking the fall of said waves, said lower body portion incorporating at least one fluid fillable chamber for holding, static, a volume of fluid, said chamber being enclosed on the top and sides, and with a mouth opening on the bottom of said wave follower, and a one-way valve means between said lower body portion and the atmosphere, allowing air, trapped in said chamber, to be vented to the atmosphere, thereby allowing fluid to freely enter said chamber through said opening during the ascent of waves.

11. A device as defined in claim 2,
- wherein said wave follower means may have an outer surface having a plurality of depressions for the purpose of increasing the lifting action of waves on said wave follower and a bottom surface which is formed to incorporate one or a plurality of depressions, which may be concave, in order to maximize the ability of said wave follower to benefit from surface adhesion and suction when a wave is falling away.

12. A device as defined in claim 2, wherein said apparatus comprises:
- support means being solidly attached to earth;
- said drive transfer means linking said wave follower means and said driven device, the drive transfer means being lever arms which can determine mechanical advantage, said lever arm means being pivotally attached at a fulcrum to said support means;
- counterweight means being attached at an opposite end of said lever arm means from said wave follower means, to better balance the weights on either side of said lever arm means;
- side wall means to contain the arriving waves in order to focus forces other than buoyant force on said wave follower means;
- rear wall means located on the leeward side of said wave follower means and being part of said support means or of said wave follower means and acting as a wave terminating member for the purpose of focusing forces, other than buoyancy and gravity, on said wave follower means;
- underwater angled ramp means, being either straight or curved, to increase the height of arriving waves, thus resulting in increased wave follower travel distance, and wherein said underwater angled ramp means may be combined with or integrated into said rear wall means;
- funneling panels means to increase the height of arriving waves, thus resulting in increased wave follower travel distance;
- floatation means to render said support means buoyant in order to eliminate the need for said wave follower means to provide buoyancy to the apparatus, said floatation means to move said apparatus up and down with the tides but not with the waves.

13. A device as defined in claim 3, wherein said apparatus comprises:
- vertically oriented surge reaction plates means positioned both in front of and behind said apparatus and below water level at a depth beyond any significant wave action; said vertically oriented surge reaction plates being buoyed up and anchored and secured to said apparatus by means of cables, for the purpose of stabilizing said apparatus against lateral wave motion;
- outrigger reactor means, for the purpose of keeping the front of said apparatus aligned with incoming waves, said outrigger reactor means being fixedly attached to said rotatable support means by arms and extending out from the sides of said rotatable support means and wherein alignment occurs due to less force being required to rotate said apparatus than to lift one of said outrigger reactor means;
- counterweight means being attached at an opposite end of said lever arm means from said wave follower means, to better balance the weights on either side of said lever arm means;
- side wall means to contain the arriving waves in order to focus forces other than buoyant force on said wave follower means;
- rear wall means located on the leeward side of said wave follower means and being part of said support means or of said wave follower means and acting as a wave terminating member for the purpose of focusing forces, other than buoyancy and gravity, on said wave follower means;
- underwater angled ramp means, being either straight or curved, to increase the height of arriving waves, thus resulting in increased wave follower travel distance, and wherein said underwater angled ramp means may be combined with or integrated into said rear wall means;
- funneling panels means to increase the height of arriving waves, thus resulting in increased wave follower travel distance.

14. A device as defined in claim 2, wherein said load release and re-establish means is utilized for increasing the effective travel distance of any combination of said wave follower means, said lever arm means and said drive transfer means on both the rise and fall of said waves, said load release and re-establish means being connected such that said wave follower means, said lever arm means or said drive transfer means or any combination of them can suddenly change their position in relation to the body of fluid in which said wave follower is floating, without having to overcome the resistance of, or to actuate any attached driven device; said load release and re-establish means being designed to release and then re-establish said load twice per wave cycle, first, when said wave follower is at or near the top of the crest of a wave and second, when said wave follower is at or near the bottom of the trough of a wave, and wherein said load release and re-establish means could function with single acting wave followers which produce work in one direction only, thus eliminating the need for such single acting wave followers to employ springs, weights, elastic members or other means to pull said single acting wave follower back into a wave trough.

15. A device as defined in claim 3, wherein said apparatus includes:
- windmill means and solar panels means to increase device output, which may be attached to additional support members passing through or around said wave follower means and connected to said heave reaction plates means but allowing said wave follower to move independently of said heave reaction plates means, said additional support members being used to improve the structural integrity of said apparatus.

* * * * *